United States Patent
Ito et al.

(10) Patent No.: US 10,282,147 B2
(45) Date of Patent: *May 7, 2019

(54) IMAGE FORMING DEVICE AND CONTROL METHOD

(71) Applicant: CANON KABUSHIKI KAISHA, Tokyo (JP)

(72) Inventors: Koji Ito, Inagi (JP); Yuuki Wakabayashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/041,440

(22) Filed: Jul. 20, 2018

(65) Prior Publication Data

US 2018/0329660 A1   Nov. 15, 2018

Related U.S. Application Data

(63) Continuation of application No. 15/472,874, filed on Mar. 29, 2017, now Pat. No. 10,048,909.

(30) Foreign Application Priority Data

Mar. 31, 2016   (JP) ................................. 2016-072789

(51) Int. Cl.
*G06F 3/12* (2006.01)
*H04W 12/06* (2009.01)
*H04W 4/80* (2018.01)

(52) U.S. Cl.
CPC .......... *G06F 3/1236* (2013.01); *G06F 3/1222* (2013.01); *G06F 3/1238* (2013.01); *G06F 3/1292* (2013.01); *H04W 12/06* (2013.01); *H04W 4/80* (2018.02)

(58) Field of Classification Search
USPC ...................................... 358/1.15
See application file for complete search history.

(56) References Cited

U.S. PATENT DOCUMENTS

| | | | |
|---|---|---|---|
| 2014/0139892 A1* | 5/2014 | Shimizu | H04N 1/00204 358/474 |
| 2015/0093992 A1* | 4/2015 | Tanaka | H04B 7/26 455/41.2 |
| 2016/0150105 A1* | 5/2016 | Shinomiya | H04N 1/00307 358/1.15 |
| 2016/0286341 A1* | 9/2016 | Lee | H04W 76/023 |
| 2016/0373594 A1* | 12/2016 | Kurihara | H04N 1/00103 |

* cited by examiner

*Primary Examiner* — Ngon B Nguyen
(74) *Attorney, Agent, or Firm* — Canon USA Inc., IP Division

(57) ABSTRACT

An image forming device includes a communication unit communicating with an information processing device via a predetermined communication method, an printing unit performing printing based on a job received from the information processing device, at least one processor, and at least one computer-readable storage medium storing computer executable instructions, when executed by the at least one processor, cause the at least one processor to perform operations including transmitting first information including information based on a first transmission power at the first transmission power, receiving predetermined information from the information processing device, and transmitting, in a case where the predetermined information is received, second information at the first transmission power.

20 Claims, 15 Drawing Sheets

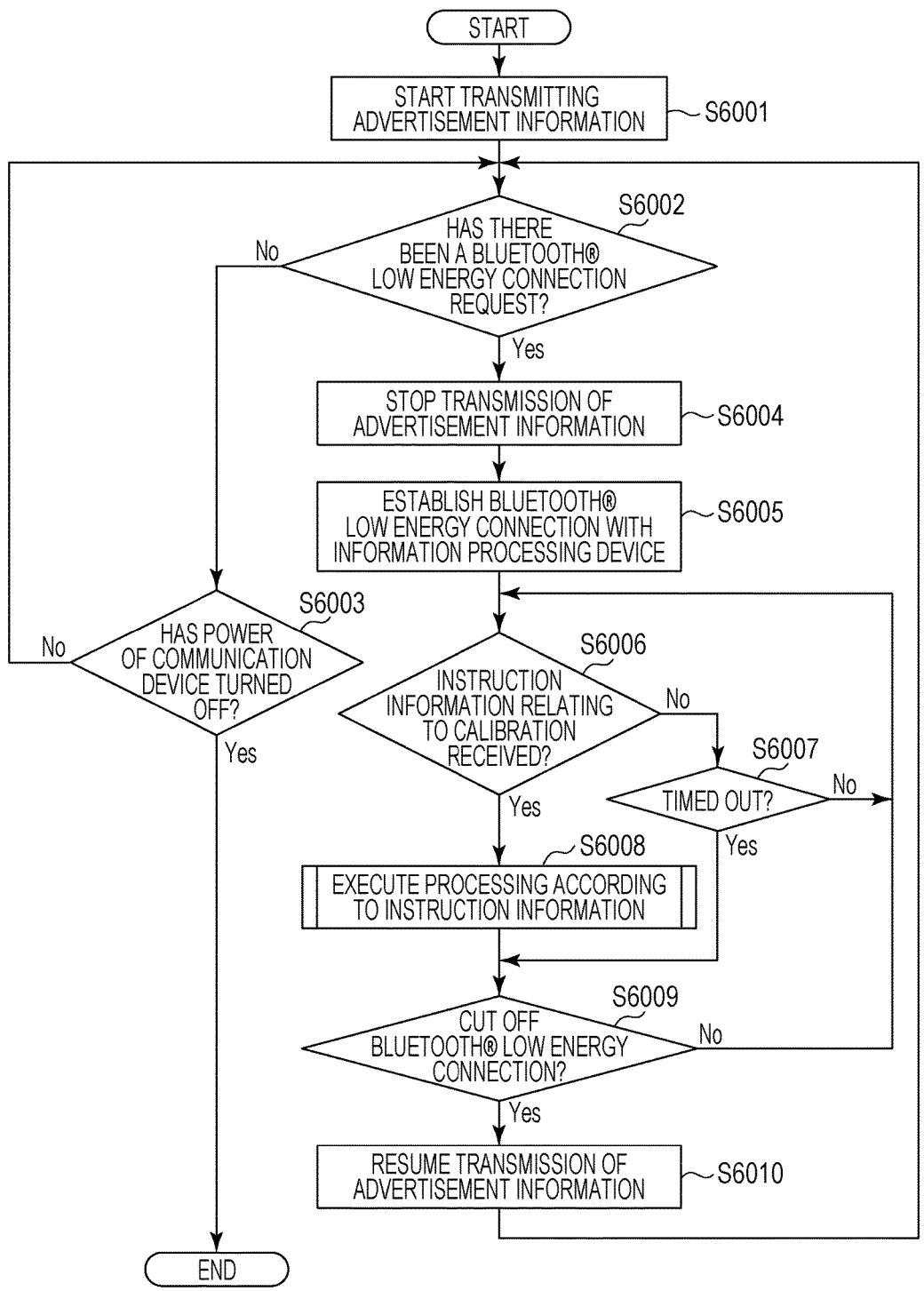

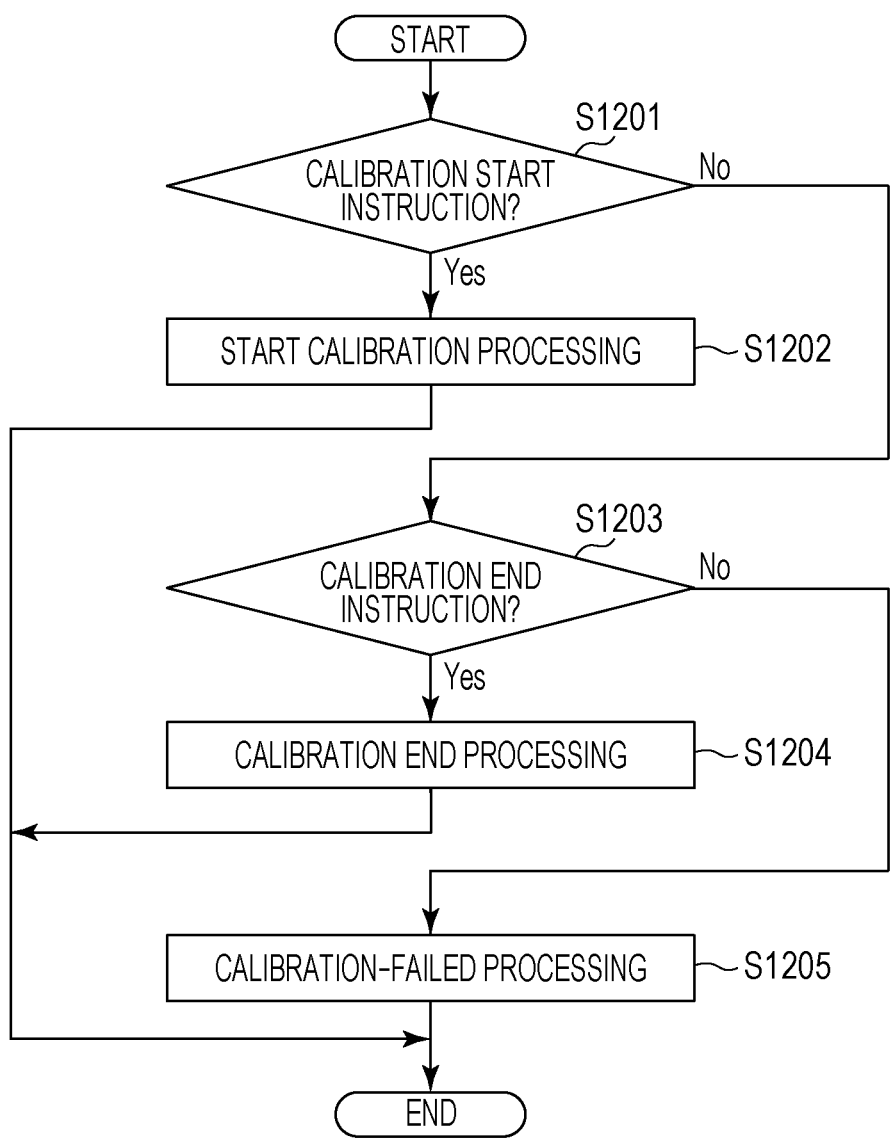

IMAGE FORMING DEVICE AND CONTROL METHOD

CROSS-REFERENCE TO RELATED APPLICATIONS

This application is a continuation application of U.S. patent application Ser. No. 15/472,874 filed on Mar. 29, 2017 which claims the benefit of Japanese Patent Application No. 2016-072789, filed Mar. 31, 2016, each of which are hereby incorporated by reference herein in its entirety.

BACKGROUND

Field

The present disclosure relates to an image forming device and a control method.

Description of the Related Art

There are known communication systems where information processing devices such as smartphones and the like and communication devices such as printers and the like communicate by short-range wireless communication such as Bluetooth® Low Energy or the like. In such communication systems, communication devices suppress unintended communication from occurring with a device possessed by a third party by restricting the transmission power of information to restrict the distance over which information reaches. In such arrangements where the transmission power of information is restricted, the communication device performs processing to change the transmission power of information, in order to adjust the distance over which the information reaches to an appropriate distance. Japanese Patent Laid-Open No. 2000-295658 describes a device that increases the transmission power of airwaves in stages, until a response is returned from the communication partner device, and determines that the transmission power of airwaves at the point that a response is received from the communication partner device is the minimally necessary transmission power for transmission of airwaves.

The arrangement where the transmission power of information is changed as described in Japanese Patent Laid-Open No. 2000-295658 has the following problems. First, Japanese Patent Laid-Open No. 2000-295658 describes increasing the transmission power or airwaves in stages until a response is returned from the communication partner device. Accordingly, in a case where a time lag occurs in the communication partner device from the reception of the airwaves until returning the response, for example, the arrangement in Japanese Patent Laid-Open No. 2000-295658 can continue to increase the transmission power of airwaves even though the communication partner device is already receiving. The arrangement in Japanese Patent Laid-Open No. 2000-295658 then determines the transmission power of airwaves at the point that the response is received from the communication partner device to be the minimally necessary transmission power for transmission of airwaves. Accordingly, the arrangement in the Japanese Patent Laid-Open No. 2000-295658 has a risk of transmitting airwaves at an unnecessarily high transmission power. It has been found desirable to cause a communication device to transmit information at an appropriate transmission power.

SUMMARY

An image forming device includes a communication unit configured to communicate with an information processing device via a predetermined communication method, an printing unit configured to perform printing based on a job received from the information processing device, at least one processor, and at least one computer-readable storage medium storing computer executable instructions that, when executed by the at least one processor, cause the at least one processor to perform operations including transmitting, using the communication unit, first information including information based on a first transmission power at the first transmission power, receiving, using the communication unit, predetermined information from the information processing device, wherein the predetermined information is transmitted by the information processing device in a case where the first information has been received by the information processing device to cause the image forming device to transmit second information that differs from the first information via a predetermined communication method, and transmitting, using the communication unit, in a case where the predetermined information is received, the second information at the first transmission power.

Further features will become apparent from the following description of exemplary embodiments with reference to the attached drawings.

BRIEF DESCRIPTION OF THE DRAWINGS

FIG. 6 is a flowchart illustrating processing that a communication device according to the first embodiment executes.

FIG. 12 is a flowchart illustrating processing that a communication device according to the second embodiment executes.

DESCRIPTION OF THE EMBODIMENTS

Embodiments will be exemplarily described below, with reference to the drawings. It should be understood that one having ordinary skill in the art can make various modifications and improvements on the embodiments described below without departing from the spirit and scope of the embodiments, and that such modifications and improvements are also encompassed by the scope of the present disclosure.

First Embodiment

Overall System Configuration

Description will be made regarding the information processing device and communication device included in the communication system according to the present embodiment. An example of a smartphone is given as the information processing device and an example of a printer is given as the communication device in the present embodiment. While a smartphone is exemplified as the information processing device in the present embodiment, this is not restrictive, and various devices can be applied, such as a mobile terminal, laptop PC, tablet terminal, personal digital assistant (PDA), digital camera, and so forth. While a printer is exemplified as the communication device in the present embodiment, this is not restrictive, and various devices can be applied, as long as the device can wirelessly communicate with the information processing device. Examples of a printer include an ink-jet printer, full-color laser beam printer, monotone printer, and so forth. The communication device is not restricted to printers, and can be applied to a photocopier, facsimile device, mobile terminal, smartphone, laptop PC, tablet terminal, PDA, digital camera, music player, television set, and so forth. The communication device can be applied to a multifunction device that has multiple functions, such as copying functions, facsimile functions, printing functions, and so forth.

Figure 1:
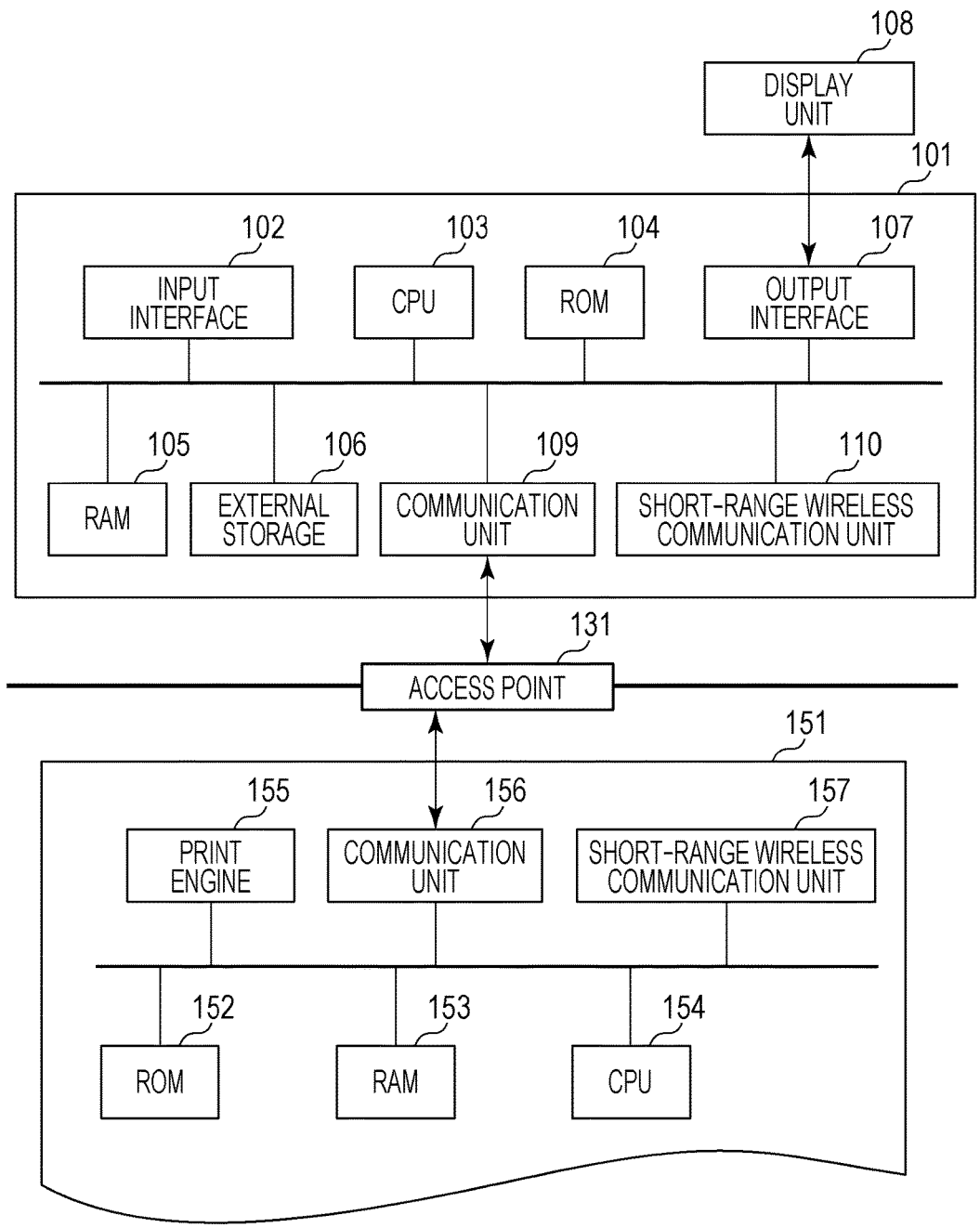
FIG. 1 is an illustrated example of the configuration of an information processing device and communication device according to an embodiment.

First, the configurations of the information processing device and communication device according to the present embodiment will be described with reference to the block diagram illustrated in FIG. 1. While description of the present embodiment will be made by way of the configuration exemplified in FIG. 1, the devices are not restricted to the functions illustrated herein.

Information processing device 101 is the information processing device according to the present embodiment and includes an input interface 102, a central processing unit (CPU) 103, read-only memory (ROM) 104, random access memory (RAM) 105, external storage 106, an output interface 107, a display unit 108, a communication unit 109, a short-range wireless communication unit 110, and so forth. These components are connected to each other via a system bus.

The input interface 102 is an interface that accepts data input and operation instructions from a user, via an operating unit (omitted from illustration) such as physical keys, buttons, a touch panel, or the like. At least part of the operating unit and the below-described display unit 108 can be integrated, so that, for example, output from a screen and accepting operations from the user are performed on the same screen. The CPU 103 is a system control unit. The CPU 103 controls the overall information processing device 101 by executing programs and activating hardware. The ROM 104 stores fixed data, such as control programs executed by the CPU 103, data tables, embedded operating system (OS) programs, and so forth. The control programs stored in the ROM 104 in the present embodiment perform software execution control such as, for example, scheduling, task switching, interrupt processing, and so forth, under control of the embedded OS stored in the ROM 104.

The RAM 105 includes static RAM (SRAM) that needs a backup power source, dynamic RAM (DRAM), or the like. The data in the RAM 105 can be kept by a primary battery for data backup, which is omitted from illustration. In this case, the RAM 105 can store important data such as program control variables and the like in a non-volatile manner. A memory area for storing settings information of the information processing device 101 and management data and the like of the information processing device 101 is also provided to the RAM 105. The RAM 105 also is used as main memory and work memory for the CPU 103.

The external storage 106 stores applications that provide printing execution functions, print information generating programs that generate print information interpretable by a communication device 151, and so forth. The external storage 106 also stores various types of programs such as information transmission/reception control programs for transmission/reception with the communication device 151 connected via the communication unit 109, and various types of information used by these programs.

The output interface 107 is an interface that performs control so that the display unit 108 can display data and provide notification regarding the state of the information processing device 101. The display unit 108 includes light-emitting diodes (LED), a liquid crystal display (LCD), or the like, and displays data and performs notification of the state of the information processing device 101. A soft keyboard including numeric input keys, mode setting keys, an OK key, a cancel key, a power key, and so forth, can be provided on the display unit 108 to enable user input to be accepted via the display unit 108.

The communication unit 109 is a component that connects to an external device such as the communication device 151 to execute data communication. The communication unit 109 can, for example, connect to an access point (omitted from illustration) within the communication device 151. Connecting the communication unit 109 and the access point within the communication device 151 enables communication between the information processing device 101 and the communication device 151. The communication unit 109 can directly communicate with the communication device 151 via wireless communication, or can communicate via an external access point that exists external to the information processing device 101 and the communication device 151 (access point 131). Examples of wireless communication standard (method) used by the communication unit 109 include Wireless Fidelity (Wi-Fi®), Bluetooth®, and so forth. Examples of the access point 131 include devices such as a wireless local area network (LAN) router and so forth. In the present embodiment, an arrangement where the information processing device 101 and communication device 151 directly connect without going through an external access point will be referred to as "direct connection", and an arrangement where the information processing device 101 and communication device 151 connect via an external access point will be referred to as "infrastructure connection". The information processing device 101 transmits print jobs for the communication device 151 to print, via the communication unit 109 in the present embodiment. Jobs that are transmitted are not restricted to print jobs, an can include scan jobs for the communication device 151 to perform scans, setting commands to change settings of the communication device 151, and so forth.

The short-range wireless communication unit 110 is a component that wirelessly connects to devices such as the communication device 151 and so forth at close distance to perform data communication, and performs communication using a different communication format from the communication unit 109. The short-range wireless communication unit 110 is connectable to a short-range wireless communication unit 157 within the communication device 151. Bluetooth® Low Energy is used as the communication format for the short-range wireless communication unit 110 in the present embodiment. That is, the short-range wireless communication unit 110 includes a Bluetooth® Low Energy unit. The Bluetooth® Low Energy unit includes a microprocessor that processes wireless communication, and a wireless communication circuit that transmits/receives data via wireless communication. The microprocessor includes RAM and flash memory. The communication format of the short-range wireless communication unit 110 is not restricted to Bluetooth® Low Energy, and, for example, near field communication (NFC) or Wi-Fi Aware™ can be used.

Communication device 151 is the communication device according to the present embodiment. The communication device 151 includes ROM 152, RAM 153, a CPU 154, a print engine 155, a communication unit 156, the short-range wireless communication unit 157, and so forth. These components are mutually connected via a system bus.

The communication unit 156 includes an access point to connect to external devices such as the information processing device 101 and so forth, as an access point within the communication device 151. This access point can connect to the communication unit 109 of the information processing device 101. The communication unit 156 can directly communicate with the information processing device 101 via wireless communication, or can communicate via the access point 131. Examples of communication formats include Wi-Fi®, Bluetooth®, and so forth. The communication unit 156 can include hardware to function as an access point, or can operate as an access point by software to function as an access point.

The short-range wireless communication unit 157 is a configuration that wirelessly connects to devices such as the information processing device 101 and so forth at close distance. Bluetooth® Low Energy is used as the communication format of the short-range wireless communication unit 157 in the present embodiment. That is, the short-range wireless communication unit 157 includes a Bluetooth® Low Energy unit. The Bluetooth® Low Energy unit includes a microprocessor that processes wireless communication, and a wireless communication circuit that transmits/receives data by wireless communication. The microprocessor includes RAM and flash memory. The communication format of the short-range wireless communication unit 157 can, for example, use near field communication (NFC) or Wi-Fi Aware™.

The RAM 153 is configured using SRAM that requires a backup power source or DRAM, or the like. The data in the RAM 153 can be kept by a primary battery for data backup that is omitted from illustration. In this case, the RAM 153 can store important data such as program control variables and the like, in a non-volatile manner. A memory area for storing settings information of the communication device 151 and management data and the like of the communication device 151 is also provided to the RAM 153. The RAM 153 is also used as main memory and work memory for the CPU 154, and serves as a reception buffer to temporarily save print information received from the information processing device 101 or the like, and to save various types of information.

The ROM 152 stores fixed data, such as control programs executed by the CPU 154, data tables, OS programs, and so forth. The control programs stored in the ROM 152 in the present embodiment perform software execution control such as scheduling, task switching, interrupt processing, and so forth, under control of the embedded OS stored in the ROM 152.

The CPU 154 is a system control unit. The CPU 154 controls the overall communication device 151 by executing programs and activating hardware.

The print engine 155 performs image formation on a recording medium such as paper or the like using a recording agent such as ink or the like, based on information saved in the RAM 153 or a print job received from the information processing device 101 or the like, and outputs printing results. The print job transmitted from the information processing device 101 or the like at this time includes a large amount of transmission data, and high-speed communication is required, so reception is performed in the present embodiment via the communication unit 156 that is capable of higher-speed communication than the short-range wireless communication unit 157.

Memory such as an external hard disk drive (HDD), a secure digital (SD) card, or the like, can be connected to the communication device 151 as an optional device. Information saved in the communication device 151 can be saved in this memory.

The information processing device 101 operates as a master device in the present embodiment, and the communication device 151 operates as a slave device. While an example is described above where the information processing device 101 and communication device 151 share processing, this sharing arrangement is not restrictive, and any another processing arrangement can be used.

In the present embodiment, below-described calibration processing is performed using an application stored in the external storage 106 of the information processing device 101. The application used for the calibration processing will be referred to as a "printing app" hereinafter.

Application Screen Configuration

Figure 2:
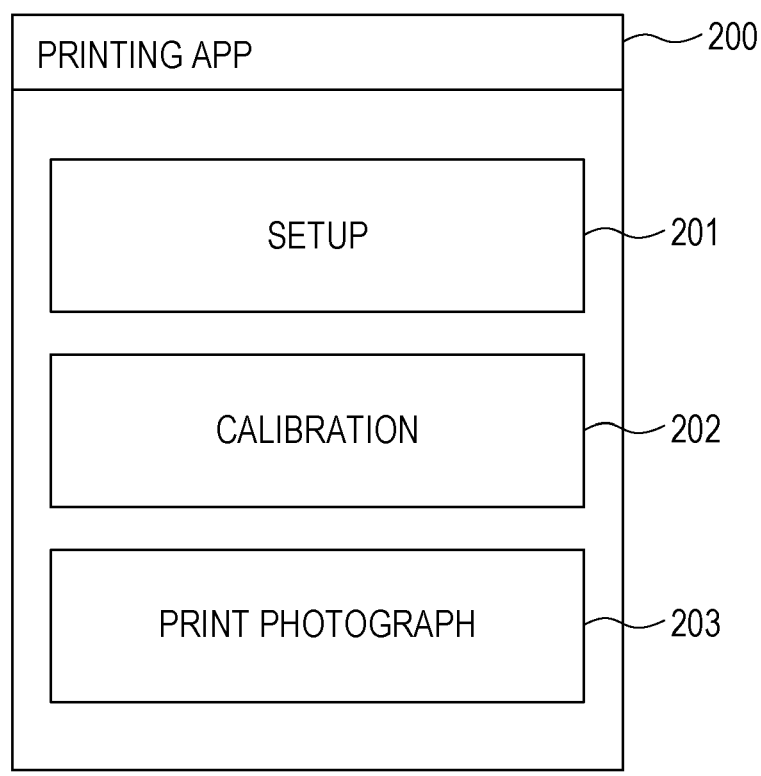
FIG. 2 is a screen configuration diagram of a printing app according to an embodiment.

FIG. 2 is a screen configuration diagram for the printing app. A screen 200 is a main screen displayed on the display unit 108 when the printing app is activated. Upon selection of a setup button 201, setup processing is performed. This setup processing is processing for connecting the communication device 151 to an access point to which the information processing device 101 is connected, thereby establishing communication between the communication device 151 and the information processing device 101.

Upon selection of a calibration button 202, calibration processing is started. This calibration processing is processing to adjust the communicable distance between the information processing device 101 and communication device 151 when performing short-range wireless communication. Details of the calibration processing will be described below. An arrangement can be made where, when the calibration button 202 is selected, a screen can be displayed to notify the user to move the information processing device 101 to a position appropriate for calibration processing. A position appropriate for calibration processing is, for example, a position in proximity to the communication device 151. A unit can, for example, be provided to the communication device 151 to which the information processing device 101 is to be placed when performing calibration, with the position of this unit being the appropriate position.

Upon selection of a print photograph button 203, a photograph selection screen is displayed on the display unit 108. When the user selects a desired photograph from the photograph selection screen, and instructs execution of printing, image data corresponding to the selected photograph is converted into a data format that the communication device 151 can interpret, and a print job is generated. The generated print job is then transmitted to the communication device 151.

Software Configuration

Figure 3A:
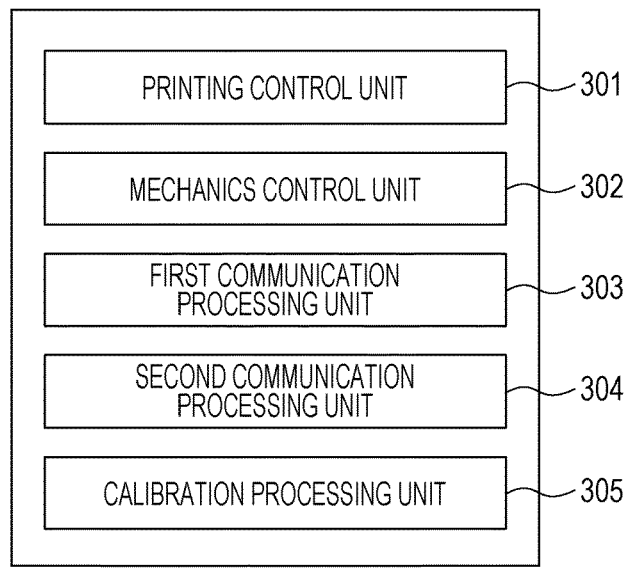
FIGS. 3A and 3B are software block diagrams of programs that run on a communication device and an information processing device according to an embodiment.

FIG. 3A is a software block diagram of a program that runs on the communication device 151. A printing control unit 301 is software that performs printing processing to form images on a recording medium using a recording agent, based on the print job that the communication device 151 has received. A mechanics control unit 302 is software that controls mechanics for sheet feeding processing and sheet discharging processing when printing. A first communication processing unit 303 is software that performs authentication processing for communication and encryption performed at the communication unit 156. A second communication processing unit 304 is software that performs Bluetooth® Low Energy-related control performed at the short-range wireless communication unit 157. A calibration processing unit 305 is software that performs adjustment of communicable distance for the short-range wireless communication performed between the short-range wireless communication unit 110 of the information processing device 101 and the short-range wireless communication unit 157 of the communication device 151 (calibration processing).

Figure 3B:
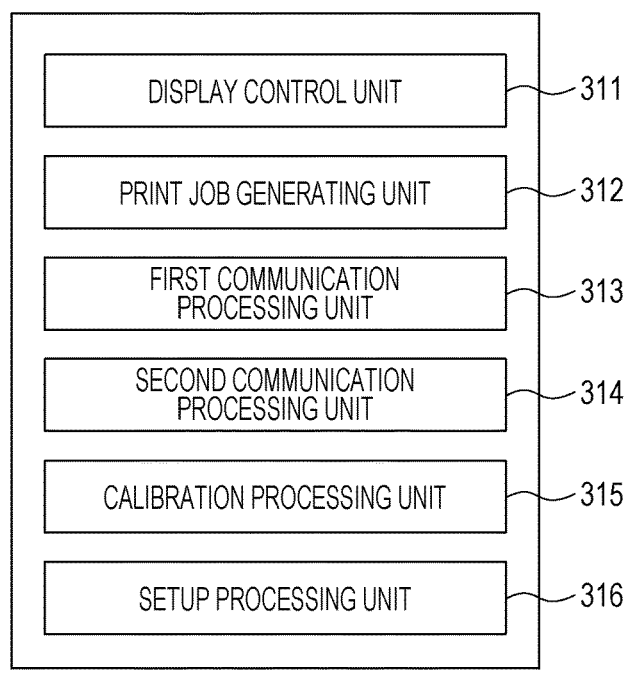

FIG. 3B is a software block diagram of a printing app that runs on the information processing device 101. A display control unit 311 is software that performs display control of the display unit 108. A print job generating unit 312 is software that performs processing of converting image data corresponding to a photograph to be printed by the printing app into data that can be interpreted by the communication device 151. A first communication processing unit 313 is software that controls the communication unit 109 of the information processing device 101 to control communication with the communication device 151. A second communication processing unit 314 is software that performs Bluetooth® Low Energy related control performed by the short-range wireless communication unit 110. A calibration processing unit 315 is software that performs adjustment of communicable distance for the short-range wireless communication performed between the short-range wireless communication unit 110 of the information processing device 101 and the short-range wireless communication unit 157 of the communication device 151 (calibration processing). A setup processing unit 316 is software for processing that transmits information for connecting to an access point to which the information processing device 101 is connected (connection information) from the information processing device 101 to the communication device 151 by short-range wireless communication (setup processing). The communication device 151 uses the connection information acquired by the setup processing to connect to the access point. This establishes communication between the information processing device 101 and the communication device 151.

GATT Profile

Figure 4:
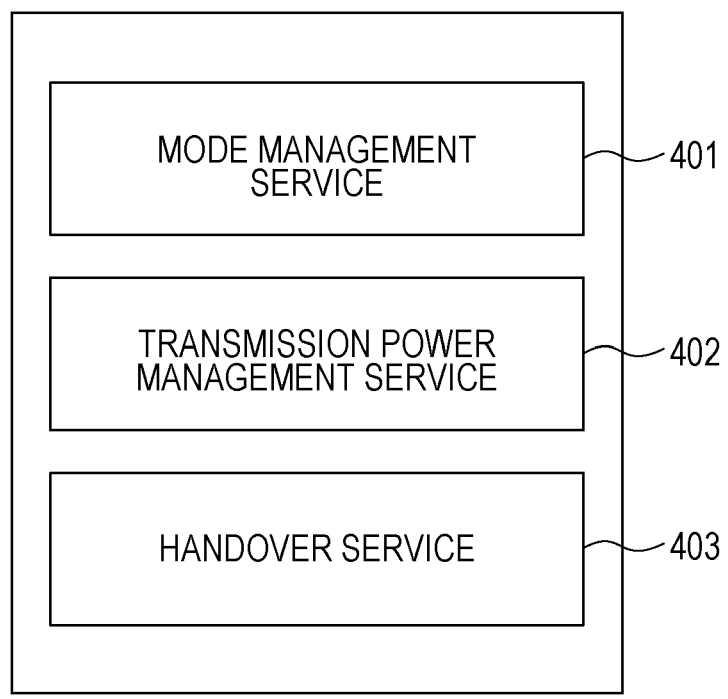
FIG. 4 is a diagram representing GATT that the communication device according to an embodiment supports.

FIG. 4 is a diagram representing Generic Attribute Profile (GATT) that the communication device 151 according to the present embodiment supports. GATT is configured of multiple services in the Bluetooth® Low Energy standard. The GATT supported by the communication device 151 in the present embodiment is configured of the three services of mode management service 401, transmission power management service 402, and handover service 403. The communication device 151 changes the contents of the advertisement information to be broadcast and the power used to transmit the advertisement information (transmission power of advertisement information) in accordance with the service to be used. The services making up the GATT that the communication device 151 supports are not restricted to the above arrangement, and other services can be included as well.

The mode management service 401 is used to connect to the information processing device 101 and receive instructions relating calibration processing. Advertisement information based on the mode management service 401 includes calibration support information used at the time of calibration processing, and parameters such as device model information and so forth for identifying the model of the communication device 151, for example. The advertisement information based on the mode management service 401 needs to reach the information processing device 101 without fail. Accordingly, the advertisement information based on the mode management service 401 is transmitted at a transmission power greater than the transmission power of advertisement information based on the transmission power management service 402 (e.g., the maximum transmission power that can be set). In a case where the advertisement information transmitted based on the mode management service 401 is transmitted at a great transmission power, there are cases where, for example, an information processing device 101, which can belong to a third party and is situated at a remote location from the communication device 151, can receive this advertisement information. Accordingly, the communication device 151 can be configured such that instructions relating to execution of primary functions of the communication device 151, such as printing, scanning, changing settings, and so forth, for example, are not accepted depending on the Bluetooth® Low Energy connection using advertisement information based on the mode management service 401. The communication device 151 can also be configured such that a below-described handover is not executed depending on the Bluetooth® Lowe Energy connection using advertisement information based on the mode management service 401. Specifically, a configuration can be made connection information for Wi-Fi® communication is not transmitted by Bluetooth® connection using advertisement information based on the mode management service 401.

While the communication device 151 is described in the present embodiment as starting broadcasting of advertisement information based on the mode management service 401 in a case where the power of the communication device 151 is turned on, this arrangement is not restrictive. For example, an arrangement can be made where broadcasting of advertisement information based on the mode management service 401 is started when the Bluetooth® functions of the communication device 151 are enabled, in a case where predetermined processing to transition the communication device 151 to calibration mode are performed (e.g., predetermined user operations on the display unit of the communication device 151), or the like.

The transmission power management service 402 is used in processing to change the transmission power and broadcast advertisement information and to perform calibration of the transmission power for advertisement information. The advertisement information based on the transmission power management service 402 includes, for example, parameters for transmission power of the advertisement information, device model information of the communication device 151, and so forth. The communication device 151 according to the present embodiment starts broadcasting of advertisement information based on the transmission power management service 402 in a case of having accepted a calibration start instruction from the information processing device 101.

The handover service 403 is used to perform connection with the information processing device 101 by high-speed wireless communication by handover. Handover is a technology for switching the communication format being used for communication between devices from short-range wireless communication to high-speed communication. In order to realize handover, the communication device 151 first transmits connection information for performing communication by high-speed communication to the information processing device 101 by short-range wireless communication, and subsequently the information processing device 101 uses the received connection information to switch the communication format being used for communication between the devices to high-speed communication. In the present embodiment, Bluetooth® Low Energy is used as the short-range wireless communication format, and Wi-Fi® is used as the high-speed communication format. The communication device 151 performs Bluetooth® Low Energy communication using the short-range wireless communication unit 157, and Wi-Fi® communication using the communication unit 156. The information processing device 101 performs Bluetooth® Low Energy communication using the short-range wireless communication unit 110, and Wi-Fi® communication using the communication unit 109. The communication speed of Bluetooth® Low Energy is slow compared to the communication speed of Wi-Fi®. Accordingly, authentication among devices and exchange of connection information for Wi-Fi® communication is performed using Bluetooth® Low Energy communication, and transfer of large amounts of data (referred to as "job") is performed using the faster Wi-Fi® communication, so efficient data transfer can be performed. Connection information for Wi-Fi® communication specifically is connection information for connection to the communication unit 156, including the service set identifier (SSID) of an access point corresponding to the communication unit 156, a password for connecting to this access point, and so forth. The advertisement information based on the handover service 403 is transmitted at the transmission power decided by below-described calibration processing.

While description is made in the present embodiment that the communication device 151 starts broadcasting of advertisement information based on the handover service 403 in a case where a predetermined operation to enable the handover function is performed, this is not restrictive. For example, an arrangement can be made where the communication device 151 starts broadcasting of advertisement information based on the handover service 403 in a case where the power of the communication device 151 is turned on, a case where the Bluetooth® Low Energy function of the communication device 151 is enabled, or the like.

The advertisement information can store information relating to intensity of transmission power. In this case, for example, information indicating a strong transmission power is stored in the advertisement information transmitted by a transmission power exceeding a predetermined threshold value, while information indicating a weak transmission power is stored in the advertisement information transmitted by a transmission power less than or equal to the predetermined threshold value. The information relating to intensity is not restricted to two stages, and can be divided into more than two stages. The information relating to the intensity can be, for example, the value of the transmission power itself, or a flag indicating intensity. For example, information indicating that the transmission power is strong is stored in advertisement information based on the mode management service 401, while information indicating that the transmission power is weak is stored in advertisement information based on the transmission power management service 402. The information processing device 101 can determine which service the received advertisement information is based on by referencing the information relating to the intensity of transmission power.

Each advertisement information can also include stored therein identification information for identifying which service the advertisement information is based on. Communication by Bluetooth® Low Energy Standard.

Now, processing for transmitting advertisement information and receipt of a start request for GATT communication (Bluetooth® Low Energy connection request) in the Bluetooth® Low Energy Standard will be described with reference to FIGS. 9 through 10B. The short-range wireless communication unit 157 operates as a slave device in the present embodiment and the short-range wireless communication unit 110 operates as the master device, so the short-range wireless communication unit 157 performs the above processing.

The short-range wireless communication unit 157 performs communication using below-described GATT communication (Bluetooth® Low Energy communication), where a 2.4 GHz frequency band is divided into 40 channels (channel 0 through 39). Of these, the 37th through 39th channels are used for transmission of advertisement information and reception of GATT communication start requests, and the 0th through 36th channels are used for data communication following Bluetooth® Low Energy connection.

Figure 9:
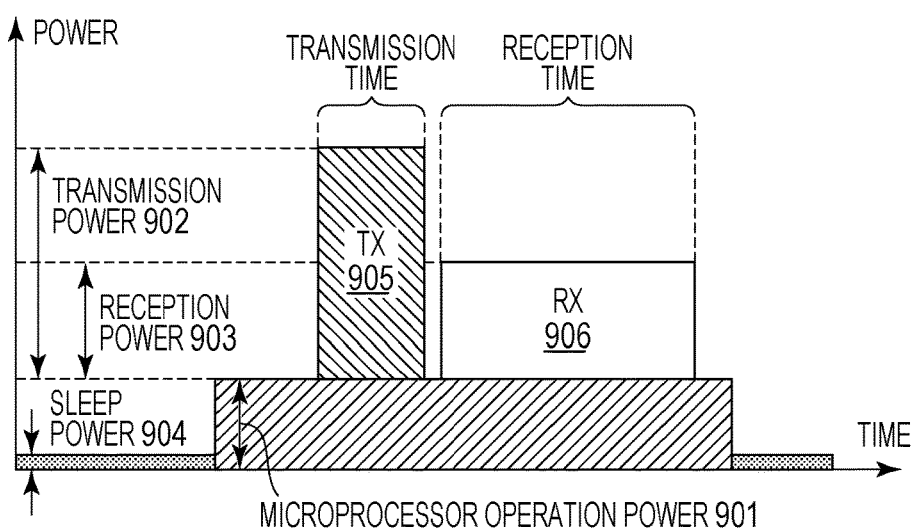
FIG. 9 is a diagram for describing processing of broadcasting advertisement information and receiving connection request information.

In FIG. 9, the vertical axis represents the power consumption of the short-range wireless communication unit 157 and the horizontal axis represents time, illustrating the power consumption for transmitting advertisement information using a single channel broken down into processes. Tx905 indicates the total amount of power consumed in processing of broadcasting advertisement information (hereinafter referred to as "transmission processing"), and Rx906 indicates the total amount of power consumed in processing of keeping the receiver enabled to receive GATT communication start requests (hereinafter referred to as "reception processing"). Transmission power 902 indicates the peak power consumption by transmission processing. Reception power 903 indicates the peak power consumption by reception processing. Microprocessor operation power 901 indicates the peak power consumption in a case where the microprocessor within the short-range wireless communication unit 157 is operating. The reason that the microprocessor is operating before, after, and during Tx905 and Rx906, is that the microprocessor needs to be active beforehand in order to execute or stop transmission/reception processing. In a case where transmission of advertisement information is performed using multiple channels, the power consumption increases proportionately to the number of channels transmitting advertisement information. In a state where the short-range wireless communication unit 157 is in a power saving mode, with the microprocessor not operating, sleep power 904 is the peak power consumption of the short-range wireless communication unit 157. The short-range wireless communication unit 157 thus performs transmission processing using a predetermined channel, and thereafter performs reception processing for a predetermined amount of time using the same channel, awaiting for transmission of a GATT communication start request from the information processing device 101.

Figure 10A:
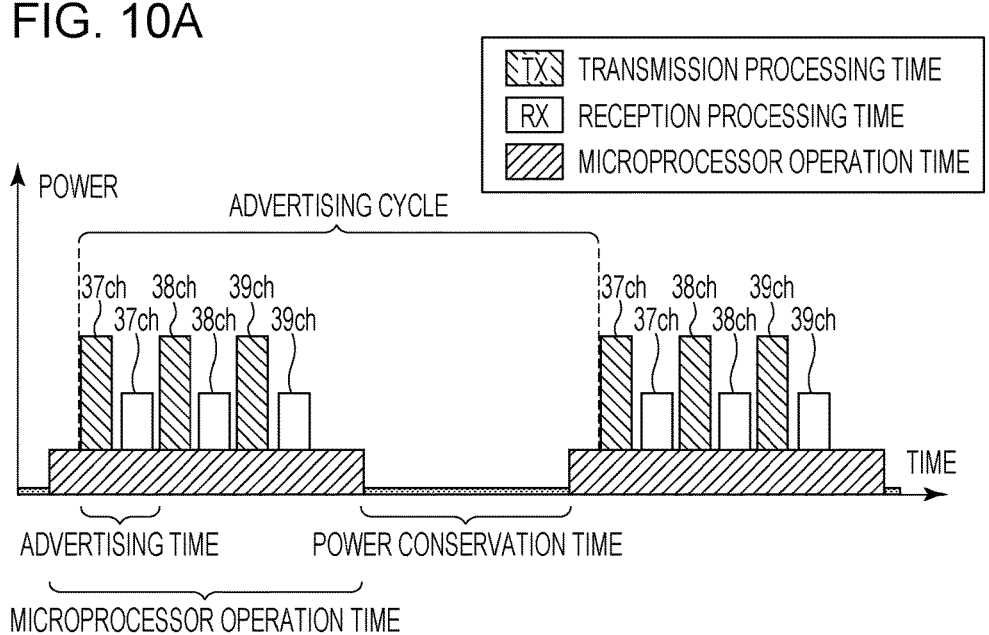
FIGS. 10A and 10B are diagrams for describing advertisement in Bluetooth® Low Energy.
Figure 10B:
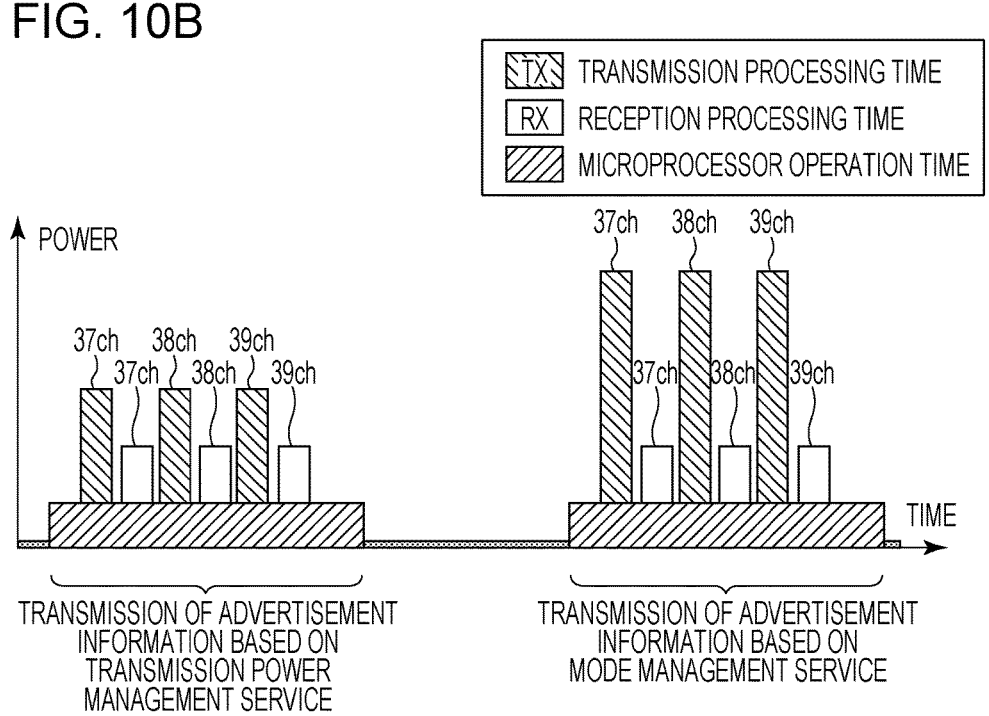

The short-range wireless communication unit 157 performs advertisement information transmission processing and reception processing three times for each channel, and then stops the microprocessor from operating and enters a power saving state for a predetermined amount of time, as illustrated in FIG. 10A. A combination of advertisement information transmission processing and reception processing at a predetermined channel will be referred to as an "advertisement", hereinafter. Also, a time cycle of transmitting advertisement information at a predetermined channel, i.e., the time cycle from transmitting advertisement information on a certain channel till transmitting the advertisement information on the same channel the next time, will be referred to as an "advertising cycle". The number of times that advertisement is repeated from the first advertisement until entering the power saving state can be any number that is less than or equal to three.

Pairing in Bluetooth® Low Energy

The information processing device 101 and the communication device 151 in the present embodiment perform mutual authentication, and perform pairing processing to realize reading and writing of data by GATT communication. GATT is a profile governing reading and writing (transmission/reception) of information in the Bluetooth® Low Energy standard. GATT communication is communication where the information processing device 101 serves as a GATT client and the communication device 151 serves as a GATT server to read and write information from the information processing device 101 to the communication device 151, using a GATT-based profile. The communication device 151 is configured such that reading and wiring of information by GATT communication is not permitted in a state where pairing has not been performed between the information processing device 101 and the communication device 151. Thus, a situation can be avoided where, for example, an unpaired information processing device 101 and communication device 151 perform communication and information held by the communication device 151 is unintentionally acquired by the unpaired information processing device 101.

Figure 13A:
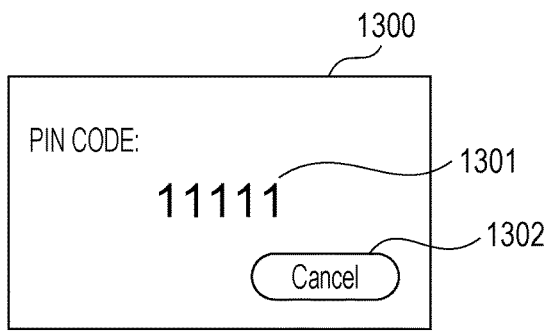
FIGS. 13A and 13B are diagrams illustrating examples of screens relating to PIN code.
Figure 13B:
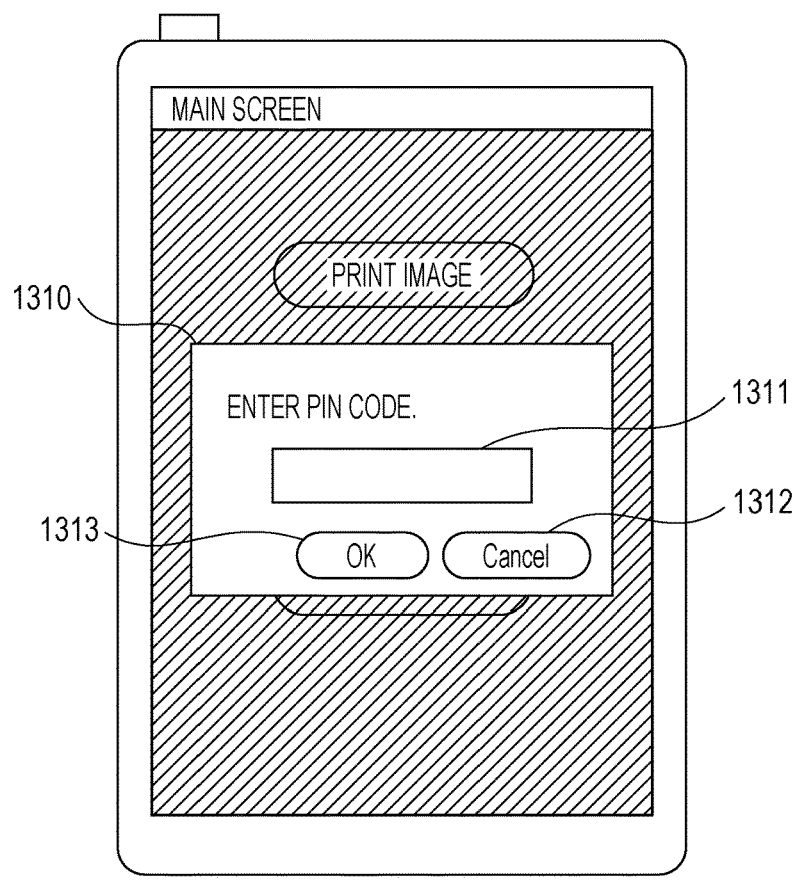

Pairing processing will now be described in detail. First, in a case where a below-described printing app is activated, and an initial screen (home screen) displayed by the printing app is displayed on the display unit 108, the information processing device 101 starts searching for advertisement information including certain device information. Examples of certain device information include a universally unique identifier (UUID) or media access control (MAC) address or the like of a device (a printer or the like) corresponding to the printing app. Upon receipt of the advertisement information including certain device information, the information processing device 101 transmits a Bluetooth® Low Energy connection request (CONNECT_REQ) to the device that transmitted this advertisement information (the communication device 151 in this case), and establishes a Bluetooth® Low Energy connection between the devices. In a case where pairing with the communication device 151 has not yet been completed, the information processing device 101 displays a screen on the display unit 108 prompting the user to perform pairing. In a case where the user instructs execution of pairing, the information processing device 101 transmits a pairing request to the communication device 151 using the security manager protocol (SMP). Communication between the devices is performed by SMP until pairing is complete. Upon receipt of the pairing request, the communication device 151 displays a PIN code display screen 1300 such as illustrated in FIG. 13A on the display unit 160. The PIN code display screen 1300 displays a PIN code 1301 and a cancel button 1302 to cancel the pairing processing. Upon transmitting the pairing request, the information processing device 101 displays a PIN code input screen 1310 such as illustrated in FIG. 13B on the display unit 108. The PIN code input screen 1310 displays a PIN code input region 1311, an OK button 1313, and a cancel button 1312. The PIN code input region 1311 is a region to accept input of the PIN code 1301 by the user. The OK button 1313 is a button to transmit the input PIN code 1301 to the communication device 151. The cancel button 1312 is a button to cancel the pairing processing. When the OK button 1313 is pressed in a state where the PIN code 1301 is input to the PIN code input region 1311, the information processing device 101 transmits information including the input PIN code 1301 to the communication device 151. The communication device 151 determines whether the PIN code 1301 included in the received information matches the PIN code 1301 displayed in the PIN code display screen 1300, and if determination is made that these match, permits the information processing device 101 to pair. Specifically, the communication device 151 transmits a link key created by a predetermined method based on the PIN code 1301 to the information processing device 101 using SMP in the Bluetooth® Low Energy standard. The link key is stored in a storage region of the information processing device 101 (ROM 104 or the like) and a storage region of the communication device 151 (ROM 152 or the like). This completes pairing, and thereafter, execution of Bluetooth® Low Energy communication is permitted among the devices. Once the pairing is completed, the information processing device 101 hides the PIN code display screen 1300 from display, and returns to displaying the original screen.

After pairing is complete, when the information processing device 101 transmits a GATT communication request to the communication device 151, the link key saved in the storage region at the time of pairing processing is notified to the communication device 151. Upon receipt of a GATT communication request, the communication device 151 compares the link key saved in the storage region at the time of pairing processing with the notified link key, and confirms whether the device transmitting the GATT communication request is a device with which pairing has been completed. In a case where confirmation has been made that the device has been paired with, the communication device 151 starts reading and writing of information with the information processing device 101 by GATT communication. Accordingly, once pairing processing with the communication device 151 is completed, the information processing device 101 can execute GATT communication with the communication device 151 without the user having to re-input the PIN code. While an arrangement has been described above where the user inputs the PIN code 1301 displayed in the PIN code input region 1311 on the PIN code input screen 1310, this arrangement is not restrictive. For example, the PIN code 1301 can be stored in the information processing device 101 at the time of installing the printing app, which will be described below. Thus, the PIN code 1301 is notified to the communication device 151 even without user input. The timing of starting the pairing processing is not restricted to the above-described arrangement either, and can be, for example, at a time when the user instructs printing via the printing app or a time before Bluetooth® Low Energy connection is performed in the connection setting processing, or the like.

Handover using Bluetooth® Low Energy

Figure 8:
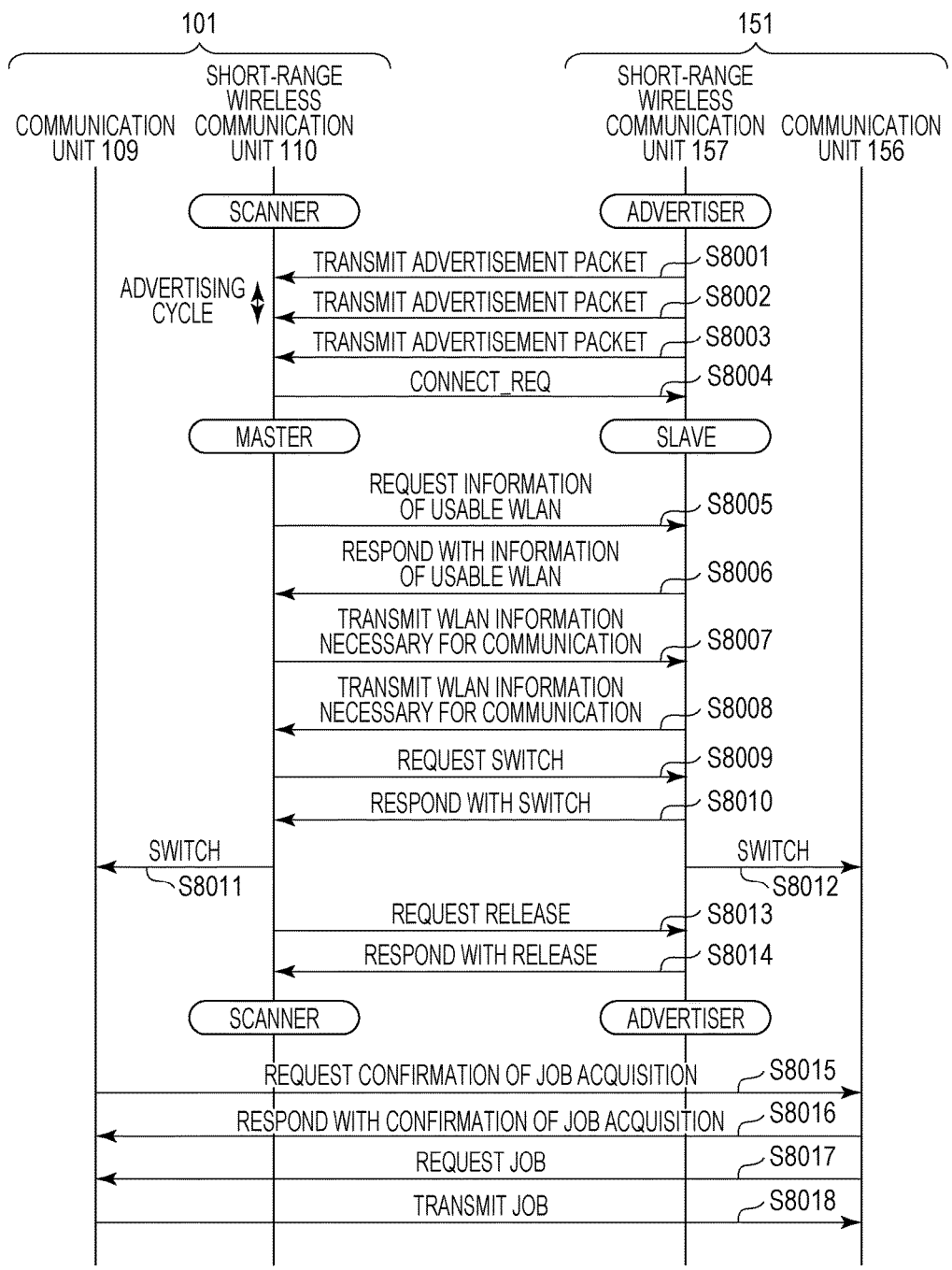
FIG. 8 is a sequence diagram illustrating an information processing device and a communication device according to an embodiment performing connection by Bluetooth® Low Energy communication.

FIG. 8 is a sequence diagram illustrating a case of the information processing device 101 and communication device 151 making a connection by Bluetooth® Low Energy communication. A case of exchanging a job by handover will be exemplarily described here. As described above, handover is a technology for devices performing communication to first exchange connection information for performing high-speed communication by short-range wireless communication and then switch to high-speed communication to exchange data. As also described above, in the present embodiment, Bluetooth® Low Energy is used for short-range wireless communication and Wi-Fi® is used for the high-speed communication. The communication speed of GATT communication is slower compared to the communication speed of Wi-Fi® communication. Accordingly, GATT communication is used to perform authentication among devices, and exchange connection information for Wi-Fi® communication (high-speed communication information), and large amounts of data (jobs in this case) are transferred by Wi-Fi® communication or the like where the communication speed is fast. This enables efficient data transfer to be realized. The communication methods used in handover are not restricted to the above form, and various types of communication formats can be used for short-range wireless communication and high-speed communication. An example configuration is using NFC or Wi-Fi Aware™ communication to exchange connection information for Wi-Fi® communication, and thereafter use Wi-Fi® communication to exchange data.

The processing of the communication device 151 illustrated in this processing sequence is realized by the CPU 154 loading a control program stored in the ROM 152 or a HDD (omitted from illustration) of the communication device 151 to the RAM 153, and executing the program. Also, the processing of the information processing device 101 illustrated in this processing sequence is realized by the CPU 103 loading a control program stored in the ROM 104 or a HDD (omitted from illustration) of the information processing device 101 to the RAM 105, and executing the program. The processing indicated in this processing sequence assumes a state where Bluetooth® Low Energy parity between the information processing device 101 and the communication device 151 has already been completed.

It will be assumed in the following description that the communication device 151 serves as the advertiser periodically transmitting advertisement information. It will also be assumed that the information processing device 101 serves as a scanner awaiting advertisement information transmitted from an advertiser. First, the short-range wireless communication unit 157 transmits advertisement information (S8001 through S8003). The information processing device 101 recognizes the presence of the communication device 151 by the short-range wireless communication unit 110 receiving advertisement information transmitted from the short-range wireless communication unit 157. The communication device 151 here is in a state of transmitting advertisement information based on the handover service 403.

Once the information processing device 101 recognizes the communication device 151 and decodes to connect to the communication device 151, the information processing device 101 transmits connection request information to the communication device 151. Specifically, the short-range wireless communication unit 110 transmits a CONNECT_REQ, which is a request to transition to a connection event for establishing a network connection by Bluetooth® Low Energy (S8004). Upon receipt by the short-range wireless communication unit 157 of the CONNECT_REQ, the information processing device 101 and communication device 151 prepare to transition to a connection event. Specifically, the short-range wireless communication unit 110 and short-range wireless communication unit 157 notify the respective CPU 103 and CPU 154 that connection preparation for a Bluetooth® Low Energy connection event has completed. Thereafter, the information processing device 101 and communication device 151 respectively transition from scanner and advertiser to master and slave, and the information processing device 101 serving as the master and the communication device 151 serving as the slave establish a Bluetooth® Low Energy connection. A star topology of one master to multiple slaves can be formed in the Bluetooth® Low Energy standard. Once the Bluetooth® Low Energy connection has been established, the information processing device 101 and communication device 151 can perform data communication by GATT communication. Thereafter, communication between the devices is performed by GATT communication until the Bluetooth® Low Energy connection is released. Note that GATT communication is performed via the short-range wireless communication units of the respective devices.

In S8005 the short-range wireless communication unit 110 requests the short-range wireless communication unit 157 for information of a communication protocol that the communication device 151 can use. This request includes information of communication protocols that the information processing device 101 can use, so by receiving this request, the short-range wireless communication unit 157 can recognize that the information processing device 101 can use communication formats such as Wi-Fi® and the like. In S8006, the short-range wireless communication unit 157 responds to the request received in S8005 with information of communication protocols that it can use itself. Accordingly, both devices can comprehend communication protocols, other than Bluetooth® Low Energy, usable with each other.

Now, assumption will be made that the information processing device 101 determines to switch the communication between the devices to Wi-Fi® communication by comprehending communication protocols usable with each other besides Bluetooth® Low Energy. The communication device 151 can determine whether to switch the communication format at this time. In a case where decision is made to switch the communication format, in S8007 and S8008, the devices exchange communication information necessary for performing Wi-Fi® communication, such as addresses for identifying the communication partner, information such as service set identifier (SSID), and so forth. Then, in S8009 the short-range wireless communication unit 110 transmits a request to switch the communication format between the devices from GATT communication to Wi-Fi®_ communication (communication switch request). Upon receiving the switch request, the short-range wireless communication unit 157 responds in S8010.

Once the switch request and response are successfully performed, in S8011, the information processing device 101 switches the communication unit used to communicate with the communication device 151 from the short-range wireless communication unit 110 to the communication unit 109. In S8012, the communication device 151 switches the communication unit used to communicate with the information processing device 101 from the short-range wireless communication unit 157 to the communication unit 156. After performing the switch, in step S8013, the short-range wireless communication unit 110 transmits a release request. The short-range wireless communication unit 157 that receives the release request, transmits a release response in S8014, which ends the Bluetooth® Low Energy connection between the devices. Upon the Bluetooth® Low Energy connection between the devices ending, the information processing device 101 and communication device 151 return to being scanner and advertiser respectively, and the short-range wireless communication unit 157 resumes transmission of advertisement information.

The devices then use the information necessary to perform Wi-Fi® communication exchanged in S8007 and S8008 and perform Wi-Fi® communication. First, in S8015, the communication unit 109 confirms whether the communication device 151 can acquire a job. Confirmation, for example, includes using information such as available capacity at the communication device 151 to temporarily store the image to be transferred. After receipt of the confirmation request, in S8016, the communication unit 156 transmits a response to the confirmation.

In a case where a correct response is obtained and determination is made that the communication device 151 can acquire a job, in S8017, the communication unit 156 requests a job. Next, in S8018, the communication unit 109 that receives the job request transmits a job including image data or the like present in the information processing device 101 to the communication unit 156. Selection of the job to be transmitted at this time is performed at a time such as, for example, before the Bluetooth® Low Energy connection is established, after the Bluetooth® Low Energy connection is established, after the Wi-Fi® connection is established, or the like. The job to be transmitted is not restricted to a printing job, and can be, for example, a scan job instructing the communication device 151 to perform a scan, a job for the information processing device 101 to acquire status information of the communication device 151, or the like. Alternatively, the job to be transmitted can be a command or the like to execute various types of operation at the communication device 151, such as, for example, changing settings of the communication device 151. Once transmission of the job has been completed, the information processing device 101 cuts off the Wi-Fi® connection with the communication device 151, and returns to the network state immediately before the handover. Specifically, in a case where the information processing device 101 had been connected to a mobile communication network, such as, for example, 3G or Long Term Evolution (LTE) or the like, or an access point such as a router or the like, before executing the handover, the connection to the mobile communication network or access point is re-established. Accordingly, the information processing device 101 and communication device 151, before executing the handover, store information of the network state and communication information necessary for returning to the network state.

Thus, using handover technology enables connection information to be exchanged for performing communication at high speed using communication with excellent usability (short-range wireless communication), followed by transfer of large amounts of data via high-speed communication.

Note that in a case where handover has been performed in which switching is performed from GATT communication to Wi-Fi® communication, the Bluetooth® Low Energy connection between the devices is cut off, so the short-range wireless communication unit 157 resumes transmission of advertisement information.

Using handover technology in this way also enables data communication to be performed between devices in a sure manner. In order to prevent communication from being performed with a third party, the communication device 151 needs to broadcast the advertisement information based on the handover service 403, which serves as a trigger for handover, at an appropriate transmission power. Accordingly, calibration processing is performed in the present embodiment so that the advertisement information based on the handover service 403 is broadcast at an appropriate transmission power.

Flow of Calibration Processing

FIGS. 5A through 7 are flowcharts illustrating calibration processing executed in the present embodiment. Note that these processes assume a state where Bluetooth® Low Energy parity between the information processing device 101 and the communication device 151 was previously completed.

Figure 5A:
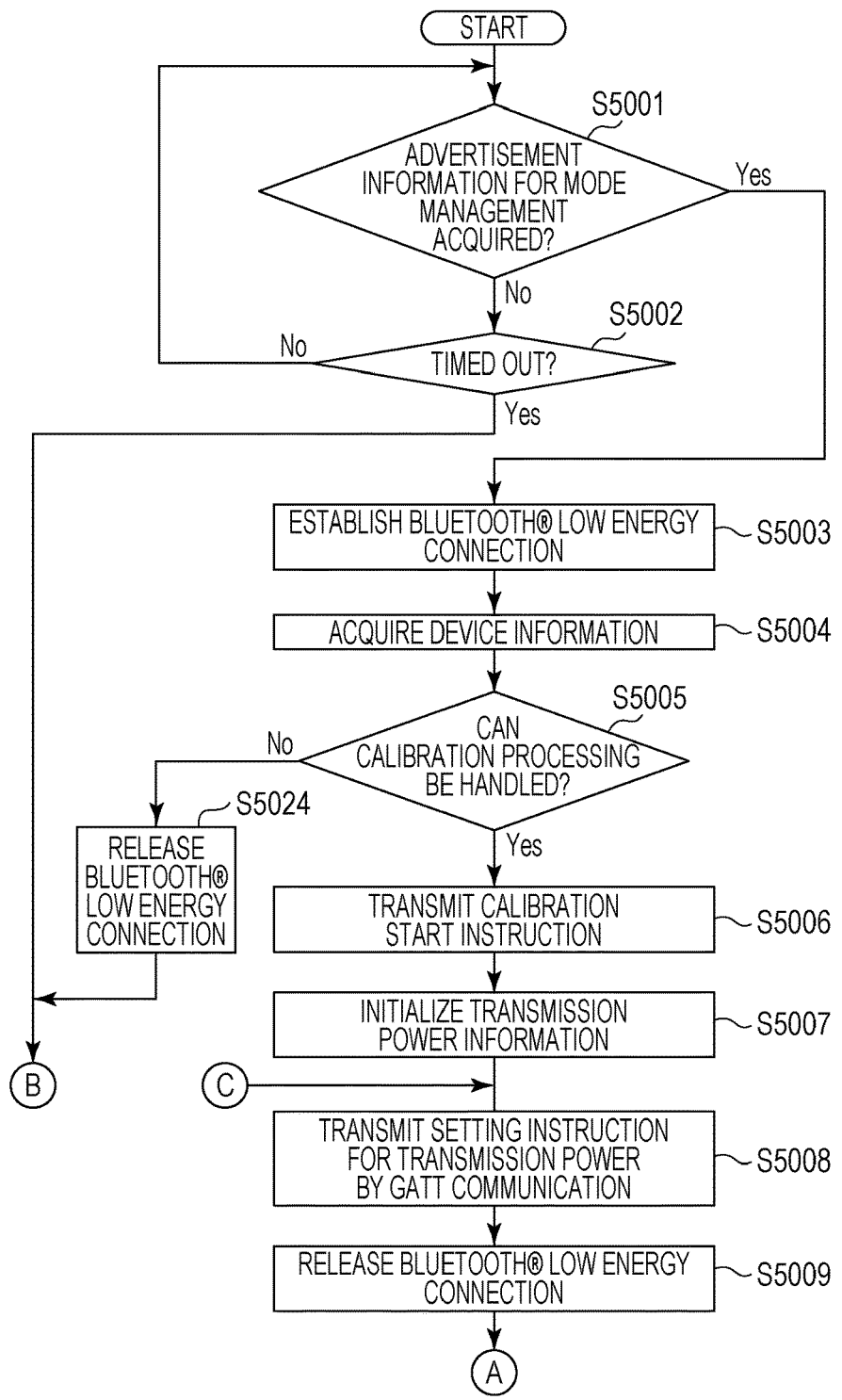
FIGS. 5A and 5B are a flowchart illustrating processing that an information processing device according to a first embodiment executes.
Figure 5B:
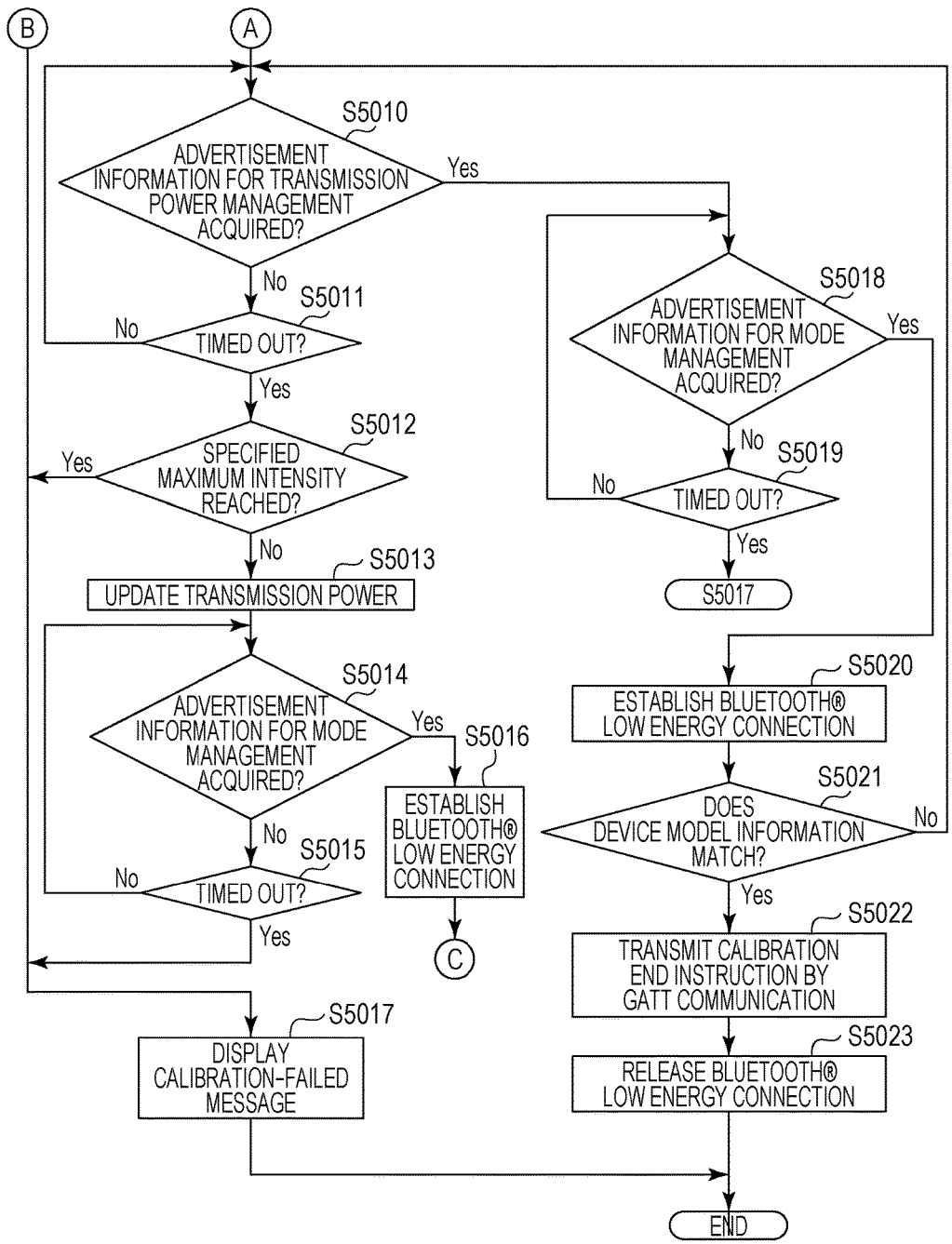

The flow of processing that the information processing device 101 performs in the present embodiment will be described with reference to FIGS. 5A and 5B. The processing illustrated in this flowchart is realized by the CPU 103 loading a control program stored in the ROM 104 or the like to the RAM 105, and executing the program. The processing illustrated in the flowchart in FIGS. 5A and 5B is realized when the calibration button 202 is selected in a state with the printing app activated at the information processing device 101. The short-range wireless communication unit 110 acts as the master device, as described above, so the short-range wireless communication unit 110 serves as the side receiving the advertisement information (scanner side). In a case where the calibration button 202 is selected, the short-range wireless communication unit 110 enters a state of receiving advertisement information (scanning state). The short-range wireless communication unit 157 acts as the slave device, as described above, so the short-range wireless communication unit 157 serves as the side broadcasting the advertisement information (advertiser side). In the present embodiment, the short-range wireless communication unit 157 enters a state of broadcasting advertisement information (advertising state) in a case where the power of the communication device 151 is turned on.

First, the CPU 103 determines whether advertisement information based on the mode management service 401 has been received by the short-range wireless communication unit 110 (S5001). Specifically, the CPU 103 at this time performs determination by receiving information whether the short-range wireless communication unit 110 has received based on the mode management service 401 from the system. Which service the received advertisement information is based on is identified by referencing the identification information included in the received advertisement information. In a case the CPU 103 determines that advertisement information has not been received, the flow advances to S5002, and determination is made whether a predetermined amount of time has elapsed since the calibration button 202 was selected (timed out). In a case the process is determined to have timed out, the CPU 103 displays a screen indicating that calibration has failed on the display unit 108 (S5017), and the calibration processing ends. In a case where the process times out without advertisement information based on the mode management service 401 being received, there is a possibility that this is due to the location where the information processing device 101 is situated not being appropriate (e.g., remote from the communication device 151). Accordingly, in S5017 the CPU 103 can display a screen prompting the user to situate the information processing device 101 in an appropriate location (e.g., closer to the short-range wireless communication unit 157). In a case where the CPU 103 determines in S5002 that the process has not timed out, the flow returns to and repeats S5001.

In a case where it is determined in S5001 that advertisement information based on the mode management service 401 has been received, the CPU 103 establishes a Bluetooth® Low Energy connection based on the mode management service 401 between the communication device 151 and the information processing device 101. Then, the CPU 103 starts GATT communication with the communication device 151 (S5003). Specifically, the CPU 103 transmits a Bluetooth® Low Energy connection request to the originator of the received advertisement information (the communication device 151 in this case), thereby establishing a Bluetooth® Low Energy connection. Establishing a Bluetooth® Low Energy connection enables the CPU 103 to realize bi-directional communication between the devices.

Next, the CPU 103 acquires information of the device with which Bluetooth® Low Energy connection has been established (the communication device 151 in this case) by GATT communication (S5004). The acquired device information includes information whether the communication device 151 can handle calibration processing, device information of the communication device 151, and so forth.

The CPU 103 then stores and analyzes the acquired device information, and determination is made whether the communication device 151 can handle calibration processing (S5005). In a case the CPU 103 determines that the communication device 151 can handle calibration processing, the flow advances to S5006. In a case the CPU 103 determines that the communication device 151 cannot handle calibration processing, the Bluetooth® Low Energy connection is released (S5024). The CPU 103 then displays a screen indicating that calibration has failed on the display unit 108 (S5017), and the calibration processing ends. The CPU 103 can provide notification to the communication device 151 to the effect that calibration has failed, using GATT communication at this time. When the calibration processing has completed, the CPU 103 releases the Bluetooth® Low Energy connection between the information processing device 101 and the communication device 151.

In S5006, the CPU 103 transmits a calibration start instruction (changing instruction information) to instruct the communication device 151 to start calibration processing by GATT communication.

After processing the change instruction transmission, the CPU 103 executes processing to initialize (initialization processing) information of transmission power for advertisement information (hereinafter referred to as "transmission power information") based on the transmission power management service 402 (S5007). The transmission power information is saved, for example, in the external storage 106 or the like, and the smallest transmission power value that is settable as transmission power information, for example, is set by the initialization processing. The CPU 103 then transmits a setting instruction of the transmission power to the currently-set transmission power information to the communication device 151 by GATT communication (S5008).

After processing the setting instruction transmission, the CPU 103 releases the Bluetooth® Low Energy connection between the information processing device 101 and the communication device 151 (S5009). Specifically, the CPU 103 transmits a request to release the Bluetooth® Low Energy connection to the communication device 151. By the Bluetooth® Low Energy connection with the information processing device 101 being released, the communication device 151 is in a state of broadcasting advertisement information. The communication device 151 at this time alternately broadcasts advertisement information based on the mode management service 401 and advertisement information based on the transmission power management service 402. The communication device 151 performs broadcasting at a transmission power based on the setting instruction for transmission power transmitted in S5008, with regard to the advertisement information based on the transmission power management service 402. The communication device 151 can change the of the advertisement information based on the mode management service 401 from the transmission power prior to setting the calibration mode. For example, the communication device 151 can increase the transmission power of the advertisement information based on the mode management service 401 to ensure that the information processing device 101 receives the advertisement information based on the mode management service 401 in a sure manner.

Next, the CPU 103 determines whether advertisement information based on the transmission power management service 402 has been received via the short-range wireless communication unit 110 (S5010). In a case where it is determined that advertisement information based on the transmission power management service 402 has not been received, the CPU 103 determines whether a predetermined amount of time has elapsed (timed out) from the time of releasing the Bluetooth® Low Energy connection in S5009 (S5011). In a case where the CPU 103 determines that the process has not timed out, S5010 is repeated, and in a case of determining that the process has timed out, the flow advances to S5012.

In S5012, the CPU 103 determines whether the value set for the transmission power information is a specified value set beforehand. The specified value set beforehand is, for example, the greatest value that can be set as transmission power information. Setting the specified value can suppress the transmission power of the advertisement information, based on the transmission power management service 402, from becoming too strong. In a case where it is determined that the value is not the specified value, the CPU 103 sets the transmission power information to a value obtained by adding the predetermined value to the value previously set to the transmission power information, thereby updating the transmission power information (S5013). The value being added does not have to be fixed, and can be variable. Subsequently, the flow advances to S5014. In a case where it is determined that the value is the specified value, the CPU 103 displays a screen, indicating that calibration has failed, in the display unit 108 (S5017), and the calibration processing ends. At this time, the CPU 103 can establish a Bluetooth® Low Energy connection between the information processing device 101 and the communication device 151 using advertisement information based on the mode management service 401, and notify the communication device 151 that calibration has failed by GATT communication.

In S5014, the CPU 103 determines whether advertisement information based on the mode management service 401 has been received by the short-range wireless communication unit 110, in the same way as in S5001. In a case of the CPU 103 determining that advertisement information has not been received, the flow advances to S5015. In S5015, determination is made whether a predetermined amount of time has elapsed since the transmission power information was updated in S5013 (timed out). In a case of determining that the process has timed out, the CPU 103 displays a screen, indicating that calibration has failed, on the display unit 108 (S5017), and the calibration processing ends. In a case where the CPU 103 determines in S5015 that the process has not timed out, S5014 is repeated. In a case of determining in S5014 that advertisement information based on the mode management service 401 has been received, the CPU 103 establishes a Bluetooth® Low Energy connection between the communication device 151 and the information processing device 101 based on the mode management service 401, in the same way as in S5003 (S5016). The flow then returns to S5008 and the CPU 103 re-executes S5008. That is, the CPU 103 instructs the communication device 151 to broadcast advertisement information based on the transmission power management service 402 at the updated transmission power value.

In a case of the CPU 103 determining in S5010 that advertisement information based on the transmission power management service 402 has been received, the flow advances to S5018. In S5018, the CPU 103 determines whether advertisement information based on the mode management service 401 has been received by the short-range wireless communication unit 110, in the same way as in S5001. In a case of the CPU 103 determining that advertisement information has not been received, the flow advances to S5019. In S5019, determination is made whether a predetermined amount of time has elapsed since determination was made in S5010 that advertisement information based on the transmission power management service 402 has been received (timed out). In a case of determining that the process has timed out, the CPU 103 displays a screen indicating that calibration has failed on the display unit 108 (S5017), and the calibration processing ends. In a case where the CPU 103 determines in S5019 that the process has not timed out, S5018 is repeated. In a case of determining in S5018 that advertisement information based on the mode management service 401 has been received, the CPU 103 establishes a Bluetooth® Low Energy connection between the communication device 151 and the information processing device 101 based on the mode management service 401, in the same way as in S5003 (S5020). The flow then advances to S5021.

In S5021, the CPU 103 determines whether the device model information of the device that originated the advertisement information, included in the received advertisement information based on the transmission power management service 402, matches the device model information acquired in S5004. In a case the CPU 103 determines that the device model information does not match, the device that originated the received advertisement information based on the transmission power management service 402 is not the device that the information processing device 101 currently has as the target of calibration processing. Accordingly, in a case where the CPU 103 determines that the device model information does not match, S5010 is re-executed, and acquisition of advertisement information based on the transmission power management service 402 from the device that the information processing device 101 currently has as the target of calibration processing is awaited. In a case the CPU 103 determines that the device model information matches, the device that originated the received advertisement information based on the transmission power management service 402 is the device that the information processing device 101 currently has as the target of calibration processing. Accordingly, in a case where the CPU 103 determines that the device model information matches, the CPU 103 transmits a calibration end instruction (changing instruction information) to the communication device 151 by GATT communication, to instruct ending of the calibration processing (S5022). The CPU 103 then releases the Bluetooth® Low Energy connection (S5023), and the calibration processing ends.

While the flowchart illustrated in FIGS. 5A and 5B according to the present embodiment starts in a state where the short-range wireless communication unit 110 is broadcasting advertisement information based on the mode management service 401, this is not restrictive. An arrangement can be made where the flow starts in a state where the short-range wireless communication unit 110 is broadcasting advertisement information based on a different service (e.g., advertisement information based on the handover service 403). In this case, in S5001 through S5007 and the first execution of S5008 and S5009, the CPU 103 performs processing targeting or using advertisement information based on the different service, instead of the mode management service 401.

While a description has been provided in the present embodiment regarding a configuration where the CPU 103 executes S5018 if determination has been made in S5010 that advertisement information based on the transmission power management service 402 has been received even once, this is not restrictive. For example, there is a possibility that the transmission power of the advertisement information based on the transmission power management service 402 cannot be maintained at a constant level. Accordingly, an arrangement can be made where determination is made in S5010 whether advertisement information based on the transmission power management service 402 has been received a predetermined number of times per unit of time. The configuration is such that S5018 is executed in a case where the CPU 103 determines that advertisement information based on the transmission power management service 402 has been received a predetermined number of times per unit of time.

While a description has provided regarding a configuration where the CPU 103 determines whether the value set in the transmission power information has reached the greatest settable value, this is not restrictive. For example, an arrangement can be made where S5012 is executed immediately before S5008, and the CPU 103 determines whether the value set in the transmission power information exceeds a predetermined threshold value as the determination in S5012. The arrangement can be such that S5017 is executed in a case where determination is made that the predetermined threshold value has been exceeded.

The flow of processing that the communication device 151 executes in the present embodiment will be described with reference to FIG. 6. The processing of the flowchart in FIG. 6 is realized by the CPU 154 loading a program stored in memory such as the ROM 152 or the like to the RAM 153, and executing the program. The processing of the flowchart in FIG. 6 is realized in a case where the power of the communication device 151 has been turned on, or a case where the Bluetooth® Low Energy communication function of the communication device 151 has been set to be enabled.

First, the CPU 154 starts advertising of advertisement information based on the mode management service 401 by the short-range wireless communication unit 157 (S6001). In a case of transmitting received advertisement information at this time, the information processing device 101 transmits a Bluetooth® Low Energy connection request based on the mode management service 401. The CPU 154 determines whether a Bluetooth® Low Energy connection request has been received (S6002).

In a case where it is determined in S6002 that no Bluetooth® Low Energy connection request was received, the CPU 154 determines whether the power of the communication device 151 is off (S6003). In a case where the CPU 154 determines that the power is not off, S6002 is re-executed. In a case where the power is determined to be off, advertising by the short-range wireless communication unit 157 is stopped and the flow ends.

In a case of determining in S6002 that a Bluetooth® Low Energy connection request has been received, the CPU 154 stops transmission of advertisement information based on the mode management service 401 (S6004). The CPU 154 then establishes a Bluetooth® Low Energy connection with the information processing device 101, and starts GATT communication (S6005).

After establishing the Bluetooth® Low Energy connection, the CPU 154 is in a state of waiting for reception of instruction information relating to calibration processing transmitted from the information processing device 101. The CPU 154 determines whether instruction information relating to calibration processing, transmitted from the information processing device 101, has been received (S6006). In a case where it is determined that no instruction information has been received, the CPU 154 determines whether a predetermined amount of time has elapsed (timed out) from establishment of the Bluetooth® Low Energy connection in (S6007). In a case where the CPU 154 determines that the process has not timed out, S6006 is re-executed.

In a case of determining that the process has timed out, the CPU 154 determines whether to cut off the Bluetooth® Low Energy connection with the information processing device 101 (S6009). Specifically, the CPU 154 determines whether a Bluetooth® Low Energy connection cutoff request has been received from the information processing device 101. At this time, the CPU 154 can determine by itself whether to cut off the Bluetooth® Low Energy connection with the information processing device 101, in accordance with the processing executed in S6008. For example, in a case of executing calibration end processing or having received a calibration failed notification, the CPU 154 can determine to cut off the Bluetooth® Low Energy connection with the information processing device 101. In a case of the CPU 154 determining to cut off the Bluetooth® Low Energy connection with the information processing device 101, broadcasting of advertisement information based on the mode management service 401 is resumed, since the Bluetooth® Low Energy connection between the devices is cut off (S6010). The advertisement information regarding which broadcasting is to be resumed can be advertising information based on another service. The CPU 154 then re-executes S6002.

In a case of determining in S6006 that instruction information has been received, the CPU 154 performs processing according to the instruction information (S6008). The CPU 154 then executes S6009 and the rest of the process.

Figure 7:
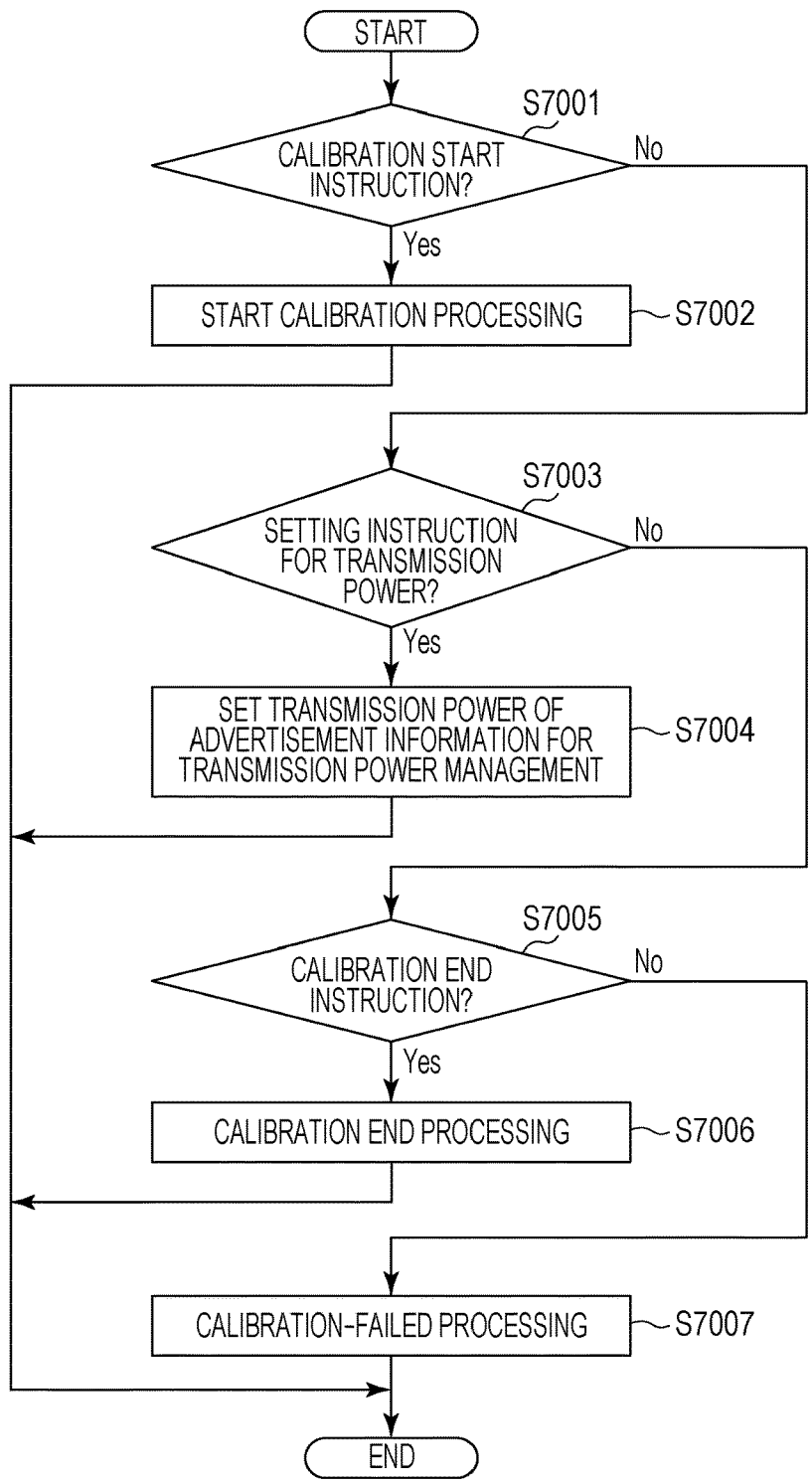
FIG. 7 is a flowchart illustrating processing that a communication device according to the first embodiment executes.

Processing that the communication device 151 executes in accordance with instruction information will be described with reference to FIG. 7. The processing of the communication device 151 in the flowchart in FIG. 7 is realized by the CPU 154 loading a program stored in memory such as the ROM 152 or the like to the RAM 153, and executing the program. The processing of the flowchart in FIG. 7 corresponds to the processing of S6008 in FIG. 6.

First, the CPU 154 determines whether the received instruction information is a calibration start instruction (S7001). In a case of determining that the received instruction information is a start instruction, the CPU 154 starts calibration processing (S7002). Specifically, the CPU 154 first performs calibration initialization processing. Calibration initialization processing specifically involves processing such as securing a region to store transmission power information received from the information processing device 101, setting the transmission power of the advertisement information based on the transmission power management service 402 to a predetermined intensity, and so forth. In the case of an arrangement where calibration processing is performed while gradually raising the transmission power, the predetermined intensity is, for example, the weakest intensity that is settable. The predetermined intensity is not restricted to the weakest intensity settable. An appropriate intensity can be set taking the usage scene of Bluetooth® Low Energy communication and so forth at the communication device 151 into consideration. After the calibration initialization processing ends, the CPU 154 transitions to a state of broadcasting advertisement information based on the mode management service 401 and advertisement information based on the transmission power management service 402. Specifically, the communication device 151 alternately broadcasts advertisement information based on the mode management service 401 and advertisement information based on the transmission power management service 402. The arrangement is not restricted to alternating between advertisement information each time a broadcast is performed once, and advertisement information can be alternated each plurality of times of broadcasting. For example, advertisement information based on the transmission power management service 402 and advertisement information based on the mode management service 401 can be alternated such as illustrated in FIG. 10B. Alternatively, two types of advertisement information can be simultaneously broadcast. Since the communication device 151 cannot execute broadcasting of advertisement information and Bluetooth® Low Energy connection at the same time, at the point of having received the calibration start instruction information by GATT communication, no advertisement information is broadcast at all. After having executed S7002, the CPU 154 ends processing according to the instruction information, and executes S6009.

In a case of determining in S7001 that the received instruction information is not a start instruction, the CPU 154 determines whether the received instruction information is a setting instruction for transmission power, i.e., whether a setting instruction has been received (S7003). In a case of determining that the received instruction information is a setting instruction for transmission power, the CPU 154 performs transmission power setting processing (S7004). Specifically, in a case of receiving a setting instruction for transmission power, the communication device 151 enters a state of transmitting advertisement information based on the transmission power management service 402 at the transmission power based on the transmission power information contained in this instruction. As described above, the communication device 151 cannot execute broadcasting of advertisement information and have a Bluetooth® Low Energy connection at the same time, so no advertisement information is broadcast at the point of having received the setting instruction for transmission power by GATT communication. After having executed S7004, the CPU 154 ends processing according to the instruction information, and executes S6009.

In a case of determining that the received instruction information is not a transmission power setting instruction, the CPU 154 determines whether the received instruction information is a calibration end instruction, i.e., whether a change instruction has been received (S7005). In a case determining that the received instruction information is a calibration end instruction, the CPU 154 executes calibration end processing (S7006). Specifically, the CPU 154 releases the state where advertisement information based on the mode management service 401 and advertisement information based on the transmission power management service 402 are being broadcast. The CPU 154 then sets the value of transmission power for the advertisement information based on the transmission power management service 402 that was set at the time of the calibration end processing as the transmission power to be used when transmitting advertisement information based on the handover service 403 thereafter. Accordingly, the present embodiment enables handover with the information processing device 101 to be performed within an appropriate range, while minimally suppressing the transmission power so as to prevent eavesdropping on communication data by a third party or the like. The processing of the communication device 151 in a case of receiving a calibration end instruction is not restricted to this arrangement. For example, an arrangement can be made where broadcasting of advertisement information based on the mode management service 401 and advertisement information based on the transmission power management service 402 is stopped, and transitioned to a state where advertisement information based on the handover service 403 is being broadcast. Since the communication device 151 cannot execute broadcasting of advertisement information and Bluetooth® Low Energy connection at the same time, at the point of receiving the calibration end instruction information by GATT communication, no advertisement information is broadcast yet. After executing S7006, the CPU 154 ends processing according to the instruction information, and executes S6009.

In a case where the CPU 154 determines in S7005 that the received instruction information is not a calibration end instruction, the received instruction information is a calibration failed notification. Accordingly, in a case of determining in S7005 that the received instruction information is not a calibration end instruction, the CPU 154 displays a screen indicating that calibration has failed on a display unit (omitted from illustration) of the communication device 151 (S7007). The CPU 154 then ends processing according to the instruction information, and executes S6009.

While a description has been provided in the present embodiment that the CPU 103 starts advertising of advertisement information based on the mode management service 401 by the short-range wireless communication unit 110 in S6001, this is not restrictive. For example, the CPU 103 can start advertising of advertisement information based on another service (i.e., advertisement information based on the handover service 403). In this case, in S7002, the CPU 103 transitions from a state of transmitting advertisement information based on the other service to a state of transmitting advertisement information based on the mode management service 401 and advertisement information based on the transmission power management service 402 in S7002.

As described above, the communication device 151 according to the present embodiment increases the transmission power of the advertisement information based on an instruction from the information processing device 101. The communication device 151 then ends calibration processing based on a calibration processing end instruction issued in a case where the information processing device 101 successfully acquires advertisement information. Accordingly, the communication device 151 can prevent the transmission power of advertisement information from being unnecessarily strong compared to a case where the transmission power of advertisement information is increased each time a predetermined amount of time elapses. For example, in an arrangement where the transmission power of advertisement information is increased each time a predetermined amount of time elapses, the transmission power of the advertisement information can become unnecessarily strong if the response issued from the information processing device 101 to end the calibration processing is delayed. The transmission power of the advertisement information is not changed in the present embodiment if there is no instruction from the information processing device 101, so even if acquisition of the calibration processing end instruction is delayed, the transmission power of the advertisement information does not become unnecessarily strong. Accordingly, the transmission power for when transmitting the advertisement information received by the information processing device 101 is decided to be the transmission power following calibration processing. That is, the communication device 151 can perform calibration of transmission power for advertisement information so the information processing device 101 can acquire advertisement information, while keeping the transmission power at an appropriate level so the advertisement information does not reach an unnecessarily broad range.

In order for the information processing device 101 to instruct the transmission power for advertisement information that the communication device 151 transmits in the above-described calibration method, a configuration for the information processing device 101 to communicate this instruction to the communication device 151 is necessary. The present embodiment realizes the above calibration method through a form where multiple types of advertisement information, based on different services, are alternately transmitted. Specifically, the above calibration method is realized by an arrangement of alternating transmission of advertisement information to change the transmission power over time, and advertisement information to execute GATT communication for the information processing device 101 to communicate an instruction to the communication device 151.

In the present embodiment, the communication device 151 also transmits not only advertisement information where the transmission power is gradually changed, but also a second type of advertisement information that is transmitted at a strong transmission power. Accordingly, the information processing device 101 can receive at least one type of advertisement information during calibration processing. Even if the information processing device 101 is in a state where the advertisement information of which the transmission power gradually changes cannot be received, the information processing device 101 can recognize that the communication device 151 is performing calibration processing.

While a description has been provided in the present embodiment that the transmission power is decided, in the calibration processing, for transmitting advertisement information based on the handover service 403 after the calibration processing, this is not restrictive. For example, transmission power for transmitting advertisement information based on the transmission power management service 402 or advertisement information based on another service, after the calibration processing, can be decided in the calibration processing. Transmission power decided in the calibration processing can also be applied to transmission power for multiple types of advertisement information based on mutually different services.

Second Embodiment

An arrangement has been described in the first embodiment where calibration processing is executed, in order for the information processing device 101 to instruct transmission power, using multiple types of advertisement information based on multiple and different services. In a second embodiment, an arrangement will be described where calibration processing is executed by the information processing device 101 instructing transmission power by an arrangement different from that of the first embodiment. The communication system according to the present embodiment is the same as that of the first embodiment, and configurations that are the same will be omitted from the following description.

In the present embodiment, advertisement information based on the transmission power management service 402 contains information of transmission power when this advertisement information was transmitted. The information processing device 101 can, by referencing this information, determine what transmission power the received advertisement information was transmitted at.

Figure 11A:
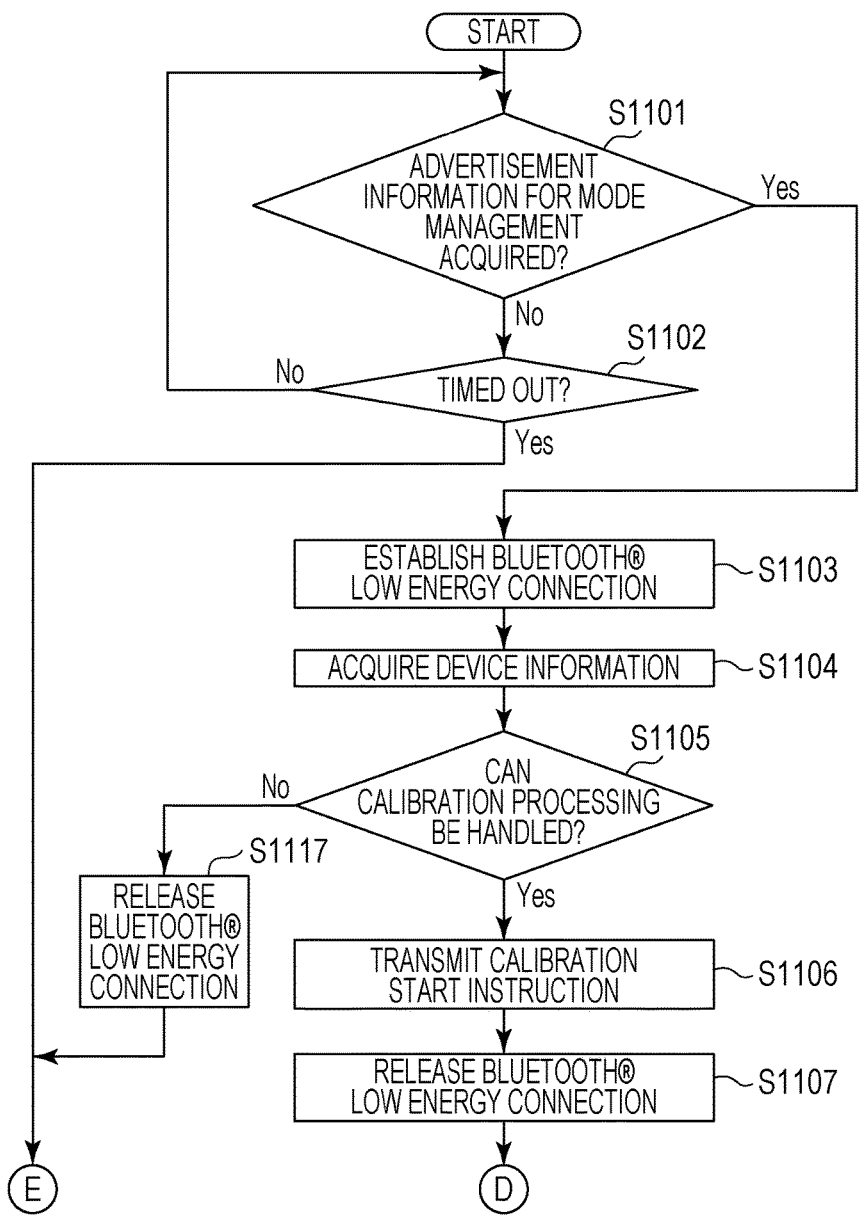
FIGS. 11A and 11B are a flowchart illustrating processing that an information processing device according to a second embodiment executes.
Figure 11B:
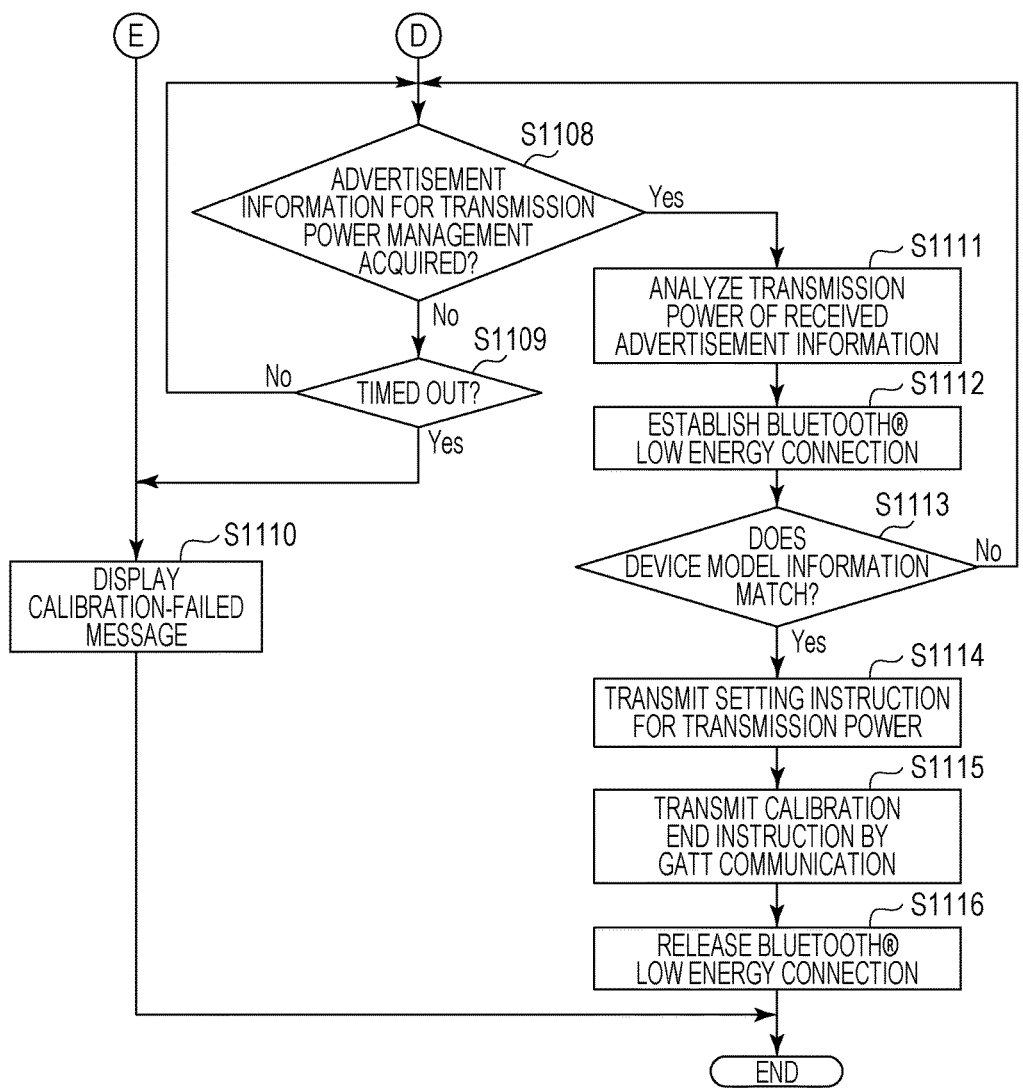

The flow of processing that the information processing device 101 executes in the present embodiment will be described with reference to FIGS. 11A and 11B. The processing illustrated in the flowchart in FIGS. 11A and 11B is realized by the CPU 103 loading a control program stored in memory such as the ROM 104 or the like to the RAM 105, and executing the program. The processing illustrated in the flowchart in FIGS. 11A and 11B is realized when the calibration button 202 is selected in a state with the printing app activated at the information processing device 101. The short-range wireless communication unit 110 in the present embodiment acts as the master device as described above, so the short-range wireless communication unit 110 serves as the side receiving the advertisement information (scanner side). In a case where the calibration button 202 is selected, the short-range wireless communication unit 110 enters a state where advertisement information can be received (scanning state). The short-range wireless communication unit 157 in the present embodiment acts as the slave device as described above, so the short-range wireless communication unit 157 serves as the side broadcasting the advertisement information (advertiser side). In the present embodiment, the short-range wireless communication unit 157 enters a state of broadcasting advertisement information (advertising state) in a case where a button is selected to enable the Bluetooth® Low Energy communication function of the communication device 151. The short-range wireless communication unit 110 broadcasts advertisement information based on the mode management service 401 at this time.

The processing in S1101 through S1105 is the same as the processing in the flowchart in FIGS. 5A and 5B, so a description is omitted herein.

In S1106, the CPU 103 transmits calibration start instruction information to the communication device 151 by GATT communication.

The processing in S1101 through S1110 is the same as the processing in S5001 through 5006, and S5009 through S5017, so a description is omitted herein.

In S1111, the CPU 103 analyzes the transmission power information contained in the received advertisement information based on the transmission power management service 402, and acquires information of the transmission power when the received advertisement information was transmitted.

In S1112, the CPU 103 establishes a Bluetooth® Low Energy connection based on the transmission power management service 402.

The processing in S1113 is the same as the processing in S5021, so a description is omitted herein.

In S1114, the CPU 103 generates a calibration processing end instruction containing an instruction to transmit advertisement information at the transmission power acquired in S1111 (setting instruction for transmission power according to the present embodiment), and transmits this to the communication device 151 by GATT communication.

The processing in S1115 and S1116 is the same as the processing in S5023 and S5024, so a description is omitted herein.

While the flowchart illustrated in FIGS. 11A and 11B according to the present embodiment starts in a state where the short-range wireless communication unit 110 is broadcasting advertisement information based on the mode management service 401, this is not restrictive. An arrangement can be made where the flow starts in a state where the short-range wireless communication unit 110 is broadcasting advertisement information based on a different service (e.g., advertisement information based on the handover service 403). In this case, in S1101 through S1107, the CPU 103 performs processing targeting or using advertisement information based on the different service, instead of the mode management service 401.

While a description is provided in the present embodiment regarding a configuration where the CPU 103 executes S1111 if it is determined in S1108 that advertisement information based on the transmission power management service 402 has been received even once, this is not restrictive. For example, there is a possibility that the transmission power of the advertisement information based on the transmission power management service 402 cannot be maintained at a constant level. Accordingly, an arrangement can be made where a determination is made in S1108 whether advertisement information based on the transmission power management service 402 has been received a predetermined number of times per unit of time. The configuration is such that S1111 is executed in a case where the CPU 103 determines that advertisement information based on the transmission power management service 402 has been received a predetermined number of times per unit of time.

The communication device 151 performs processing the same as that in FIG. 6 in the present embodiment as well. A description of processing the same as in FIG. 6 is omitted herein.

The flow of processing that the communication device 151 executes in the present embodiment will be described with reference to FIG. 12. The processing of the flowchart in FIG. 12 is realized by the CPU 154 loading a program stored in memory such as the ROM 152 or the like to the RAM 153, and executing the program. The processing of the flowchart in FIG. 12 corresponds to the processing in S6008 in FIG. 6.

The processing in S1201 is the same as the processing in S7001, so a description is omitted herein.

In S1202, the CPU 154 releases the state of broadcasting advertisement information based on the mode management service 401 and advertisement information based on the transmission power management service 402. The CPU 154 then sets the value of transmission power for the advertisement information based on the transmission power management service 402 set at the time of the calibration end processing as the transmission power to be used when transmitting advertisement information based on the handover service 403 thereafter. Accordingly, the present embodiment enables handover with the information processing device 101 to be performed within an appropriate range, while minimally suppressing the transmission power so as to prevent eavesdropping on communication data by a third party or the like. After executing S1202, the CPU 154 ends processing according to the instruction information, and executes S6009.

The processing in S1203 is the same as the processing in S7005, so a description is omitted herein.

In S1204, the CPU 154 executes calibration end processing. In a case of receiving a calibration processing end instruction in the present embodiment, the communication device 151 first references the setting instruction for transmission power contained in the calibration processing end instruction. The CPU 154 then ends the calibration processing, and enters a state of transmitting advertisement information based on the handover service 403 at the transmission power based on the referenced setting instruction for transmission power (the transmission power acquired by the CPU 103 in S1111). The communication device 151 cannot execute broadcasting of advertisement information and Bluetooth® Low Energy connection at the same time. Accordingly, at the point of receiving the calibration end instruction information by GATT communication, the communication device 151 broadcasts no advertisement information, and starts broadcasting at the point that the Bluetooth® Low Energy connection has been released. After having executed S1204, the CPU 154 ends processing according to the instruction information, and executes S6009.

The processing in S1205 is the same as the processing in S7007, so a description is omitted herein.

While a description has been provided in the present embodiment where the CPU 103 starts advertising advertisement information based on the mode management service 401 by the short-range wireless communication unit 110 in S6001, this is not restrictive. An arrangement can be made where the short-range wireless communication unit 110 is advertising advertisement information based on a different service (e.g., advertisement information based on the handover service 403). In this case, in S1202, the CPU 103 transitions from a state of transmitting based on the other service to a state of transmitting advertisement information based on the transmission power management service 402.

As described above, the communication device 151 according to the present embodiment transmits advertisement information where information of transmission power is stored, increasing the transmission power of the advertisement information each time a predetermined amount of time elapses. The communication device 151 then decides the transmission power based on a calibration processing end instruction issued in a case where the information processing device 101 successfully acquires advertisement information, as being the transmission power after calibration processing. Accordingly, the communication device 151 can decide an appropriate value for the transmission power after calibration processing, compared to an arrangement where the transmission power at the point of a response being returned from the information processing device 101 is decided as the following calibration processing. In an arrangement where the transmission power of advertisement information is increased each time a predetermined amount of time elapses, for example, the transmission power of the advertisement information can become unnecessarily strong if there is a delay in the information processing device 101 receiving the advertisement information and returning a response. In this case, in an arrangement where the transmission power at the time of receiving the response from the information processing device 101 is determined to be the transmission power after calibration processing, the transmission power that has become unnecessarily strong will be determined to be the transmission power after calibration processing. Even if the transmission power at the point of receiving the response is unnecessarily strong, the transmission power instructed by the information processing device 101 is used as the transmission power for after calibration processing. In other words, the transmission power that has become unnecessarily strong will not be decided as the transmission power for after calibration processing. The communication device 151 according to the present embodiment can prevent the transmission power that has become unnecessarily strong from being determined as the transmission power for after calibration processing, and an appropriate value instructed from the information processing device 101 can be determined as the transmission power for after calibration processing.

Third Embodiment

While an arrangement has been described in the above embodiments where advertisement information based on the transmission power management service 402 is at first transmitted at a weak transmission power in the calibration processing, and then is gradually increased, this is not restrictive. That is, advertisement information based on the transmission power management service 402, for example, can be transmitted at a strong intensity at first, with the transmission power thereafter being gradually weakened. In this case, in the initialization processing in S5007, the CPU 103, for example, sets the largest transmission power settable in the transmission power information. In a case where the CPU 103 determines that advertisement information based on the transmission power management service 402 was not received from the short-range wireless communication unit 110 in the determination in S5010, the flow advances to S5018. In a case where a calibration end instruction is accepted, the communication device 151 sets a value one stage greater than the currently-set transmission power to be the transmission power at the time of transmitting the advertisement information based on the handover service 403 thereafter.

While an arrangement has been described in the above embodiments where the communication device 151 receives a calibration start instruction by Bluetooth® Low Energy connection based on the mode management service 401, this is not restrictive. For example, a calibration start instruction can be received by a Bluetooth® Low Energy connection based on the handover service 403. In this case, the communication device 151 broadcasts advertisement information based on the handover service 403 when transitioning to an advertising state. Upon receipt of a calibration start instruction, the communication device 151 transitions from a state of transmitting information based on the handover service 403 to a state of transmitting information based on the mode management service 401 and information based on the transmission power management service 402.

The above-described embodiments can also be realized by supplying a program that realizes one or more functions of the above-described embodiments to a system or device via a network or storage medium, and one or more processors in a computer of the system or device reading out and executing the program. The above-described embodiments can also be realized by a circuit that realizes one or more functions (e.g., an application specific integrated circuit (ASIC)).

According to the above-described embodiments, information can be transmitted to a communication device at an appropriate transmission power.

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

What is claimed is:

1. A communication device capable of performing communication by Bluetooth Low Energy, the communication device comprising:
   at least one processor,
   the at least one processor being caused to perform operations comprising:
   transmitting first advertisement information based on the Bluetooth Low Energy, wherein the first advertisement information includes transmission power information relating to transmission power used for transmitting the first advertisement information by the Bluetooth Low Energy;
   receiving, by the Bluetooth Low Energy, predetermined information from an information processing device, wherein the predetermined information is transmitted by the information processing device in accordance with the first advertisement information having been received by the information processing device;
   transmitting, based on the predetermined information being received, second advertisement information that is based on the Bluetooth Low Energy and different from the first advertisement information, using transmission power same as the transmission power used for transmitting, by the Bluetooth Low Energy, the first advertisement information received by the information processing device, wherein transmission power used for transmitting, by the Bluetooth Low Energy, the second advertisement information is same as transmission power indicated by the transmission power information included in the first advertisement information received by the information processing device;
   communicating, via a Bluetooth Low Energy connection between the communication device and the information processing device that has received the second advertisement information, connection information for connecting by a predetermined communication method that is different from the Bluetooth Low Energy; and
   establishing connection by the predetermined communication method based on the connection information.

2. The communication device according to claim 1, wherein the at least one processor performs operations further comprising:
   performing authentication between the communication device and the information processing device,
   wherein the communication information is transmitted to the information processing device in a state where the authentication is completed, and the communication information is not transmitted to the information processing device in a state where the authentication is not completed.

3. The communication device according to claim 1, wherein the first advertisement information includes identification information of the communication device.

4. The communication device according to claim 1, wherein the second advertisement information includes identification information of the communication device.

5. The communication device according to claim 1, wherein the predetermined information contains information relating to the transmission power used for transmitting the first advertisement information, and
   wherein the second advertisement information is transmitted at transmission power same as the transmission power used for transmitting the first advertisement information received by the information processing device and same as the transmission power indicated by the transmission power information included in the first advertisement information received by the information processing device, based on the information relating to the transmission power used for transmitting the first advertisement information and contained in the predetermined information.

6. The communication device according to claim 1, wherein in a case where the second advertisement information is received by the information processing device, connection according to the Bluetooth Low Energy is established between the information processing device and the communication device, and
   wherein Generic Attribute Profile communication is performed via the connection according to the Bluetooth Low Energy.

7. The communication device according to claim 1, wherein the at least one processor performs operations further comprising:
   receiving a print job, via the connection with the information processing device by the predetermined communication method; and
   executing printing based on the print job.

8. The communication device according to claim 7, wherein the printing based on the print job is printing for forming an image by discharging ink onto a recording medium.

9. The communication device according to claim 1, wherein the predetermined communication method is Wi-Fi.

10. The control method according to claim 1, wherein the predetermined communication method is Wi-Fi.

11. A control method of a communication device capable of performing communication by Bluetooth Low Energy, the communication device comprising at least one processor that performs the method, the method comprising:

transmitting first advertisement information based on the Bluetooth Low Energy, wherein the first advertisement information includes transmission power information relating to transmission power used for transmitting, by the Bluetooth Low Energy, the first advertisement information;

receiving predetermined information from the information processing device by the Bluetooth Low Energy, wherein the predetermined information is transmitted by the information processing device in accordance with the first advertisement information having been received by the information processing device;

transmitting, based on the predetermined information being received, second advertisement information that is based on the Bluetooth Low Energy and different from the first advertisement information, using transmission power same as the transmission power used for transmitting, by the Bluetooth Lowe Energy, the first advertisement information received by the information processing device, wherein transmission power used for transmitting, by the Bluetooth Low Energy, the second advertisement information is same as transmission power indicated by the transmission power information included in the first advertisement information received by the information processing device;

communicating, via a Bluetooth Low Energy connection between the communication device and the information processing device that has received the second advertisement information, connection information for connecting by a predetermined communication method that is different from the Bluetooth Low Energy; and establishing connection by the predetermined communication method based on the connection information.

12. The control method according to claim 11, further comprising:

performing authentication between the communication device and the information processing device, wherein the communication information is transmitted to the information processing device in a state where the authentication is completed, and the communication information is not transmitted to the information processing device in a state where the authentication is not completed.

13. The control method according to claim 11, wherein the first advertisement information includes identification information of the communication device.

14. The control method according to claim 11, wherein the second advertisement information includes identification information of the communication device.

15. The control method according to claim 11, wherein the predetermined information contains information relating to the transmission power used for transmitting the first advertisement information, and wherein the second advertisement information is transmitted at transmission power same as the transmission power used for transmitting the first advertisement information received by the information processing device and same as the transmission power indicated by the transmission power information included in the first advertisement information received by the information processing device, based on the information relating to the transmission power used for transmitting the first advertisement information and contained in the predetermined information.

16. The control method according to claim 11, wherein in a case where the second advertisement information is received by the information processing device, connection according to the Bluetooth Low Energy is established between the information processing device and the communication device, and wherein Generic Attribute Profile communication is performed via the connection according to the Bluetooth Low Energy.

17. The control method according to claim 11, further comprising:

receiving a print job, via the connection with the information processing device by the predetermined communication method; and executing printing based on the print job.

18. The control method according to claim 17, wherein the printing based on the print job is printing for forming an image by discharging ink onto a recording medium.

19. A control method of a system including a communication device capable of performing communication by Bluetooth Low Energy, the communication device comprising at least one processor; and an information processing device comprising at least one processor, the control method comprising:

transmitting first advertisement information based on the Bluetooth Low Energy, by the at least one processor of the communication device, wherein the first advertisement information includes transmission power information relating to transmission power used for transmitting the first advertisement information by the Bluetooth Low Energy;

receiving the first advertisement information transmitted by the communication device, using the Bluetooth Low Energy, by the at least one processor of the information processing device;

transmitting, in accordance with the first advertisement information being received by the information processing device, predetermined information to the communication device, using the Bluetooth Low Energy, by the at least one processor of the information processing device;

receiving, using the Bluetooth Low Energy, the predetermined information from the information processing device, by the at least one processor of the communication device;

transmitting, based on the predetermined information being received, second advertisement information that is based on the Bluetooth Low Energy and different from the first advertisement information, using transmission power same as the transmission power used for transmitting, by the Bluetooth Low Energy, the first advertisement information received by the information processing device, by the at least one processor of the communication device, wherein transmission power used for transmitting, by the Bluetooth Low Energy, the second advertisement information is same as transmission power indicated by the transmission power information included in the first advertisement information received by the information processing device;

communicating, via a Bluetooth Low Energy connection between the communication device and the information processing device that has received the second advertisement information, connection information for connecting by a predetermined communication method that is different from the Bluetooth Low Energy; and establishing connection by the predetermined communication method based on the connection information.

20. The control method according to claim 19, further comprising:
   receiving a print job, via the connection with the information processing device by the predetermined communication method; and
   executing printing based on the print job.

* * * * *